United States Patent
Ogura et al.

(10) Patent No.: US 11,809,234 B2
(45) Date of Patent: Nov. 7, 2023

(54) FILM WRAPPING DISPLAY

(71) Applicant: Panasonic Intellectual Property Management Co., Ltd., Osaka (JP)

(72) Inventors: Motonari Ogura, Osaka (JP); Kaname Tomita, Osaka (JP); Kenji Ogura, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/512,983

(22) Filed: Oct. 28, 2021

(65) Prior Publication Data

US 2022/0050507 A1    Feb. 17, 2022

Related U.S. Application Data

(62) Division of application No. 16/910,467, filed on Jun. 24, 2020, now Pat. No. 11,416,038.

(60) Provisional application No. 62/866,224, filed on Jun. 25, 2019.

(51) Int. Cl.
  *G06F 1/16*    (2006.01)
  *G06F 3/041*    (2006.01)

(52) U.S. Cl.
  CPC .......... *G06F 1/1656* (2013.01); *G06F 1/1637* (2013.01); *G06F 3/0412* (2013.01)

(58) Field of Classification Search
  CPC ....................................................... G06F 1/16
  See application file for complete search history.

(56) References Cited

U.S. PATENT DOCUMENTS

| | | | |
|---|---|---|---|
| 10,203,433 B2* | 2/2019 | Yoon | H01L 51/5275 |
| 2002/0050782 A1 | 5/2002 | Ito et al. | |
| 2006/0209502 A1 | 9/2006 | Sakata et al. | |
| 2011/0242744 A1* | 10/2011 | Klosky | H04B 1/3888 |
| | | | 361/679.01 |
| 2012/0113369 A1 | 5/2012 | Kim et al. | |
| 2013/0321293 A1 | 12/2013 | Park et al. | |
| 2015/0296062 A1 | 10/2015 | Lee | |

(Continued)

FOREIGN PATENT DOCUMENTS

| | | |
|---|---|---|
| CN | 206058030 | 3/2017 |
| EP | 2 772 796 | 9/2014 |
| EP | 2 833 197 | 2/2015 |

(Continued)

OTHER PUBLICATIONS

The extended European Search Report dated Nov. 25, 2020 in European Patent Application No. 20181971.1.

(Continued)

*Primary Examiner* — Jerry Wu
(74) *Attorney, Agent, or Firm* — Wenderoth, Lind & Ponack, L.L.P.

(57) ABSTRACT

A film wrapping display includes a panel that is transparent to light and is configured to display information on one surface of the panel, and a film adhered to cover the one surface of the panel on which the information is displayed. The film is adhered to the other surface of the panel opposite to the one surface in addition to the one surface of the panel. An edge of the film is positioned at the other surface while the film covers an outermost periphery of the panel and extends around to the other surface.

10 Claims, 15 Drawing Sheets

(56) References Cited

U.S. PATENT DOCUMENTS

2018/0252988 A1  9/2018  Ejiri et al.
2019/0086967 A1  3/2019  Ohsawa et al.

FOREIGN PATENT DOCUMENTS

| EP | 2 876 491 | 5/2015 |
|----|-----------|--------|
| JP | 05-319759 | 12/1993 |
| JP | 11-41546 | 2/1999 |
| JP | 2002-140012 | 5/2002 |
| JP | 2003-066854 | 3/2003 |
| JP | 2005-62777 | 3/2005 |
| JP | 2006-221058 | 8/2006 |
| JP | 2009-075255 | 4/2009 |
| JP | 2010-244698 | 10/2010 |
| JP | 2010-250178 | 11/2010 |
| JP | 2014-134679 | 7/2014 |
| JP | 2016-196383 | 11/2016 |
| JP | 2018-200460 | 12/2018 |

OTHER PUBLICATIONS

The extended European Search Report dated Nov. 25, 2020 in European Patent Application No. 20181972.9.
Extended European Search Report dated Sep. 24, 2021 in European Patent Application No. 21188478.8.
Connunication pursuant to Article 94(3) EPC dated May 9, 2023 in corresponding European Patent Application No. 20 181 972.9.

\* cited by examiner

FILM WRAPPING DISPLAY

BACKGROUND OF THE INVENTION

1. Field of the Invention

The present disclosure relates to a film wrapping display.

2. Background Art

In an aircraft display mounted in an aircraft where a vibration is almost always generated, a structure is required which prevents a glass of the aircraft display from being broken and scattering when an impact is applied. In the related art, a structure having an irregular surface is adopted in which end surfaces of a glass provided with a touch panel is covered by a housing and a front surface side of the glass is covered by a film. Scattering of the glass is prevented by the structure.

However, it is assumed that a design of a tablet terminal having a flat front surface, as represented by a recent tablet terminal, is becoming mainstream, and such a flat design may also become mainstream in the aircraft display, the glass may scatter from the end surfaces during an impact load in the aircraft display.

SUMMARY OF THE INVENTION

The present disclosure provides a film wrapping display that can prevent scattering of the glass even when an impact is applied to the glass and the glass is broken.

According to an aspect of the present disclosure, there is provided a film wrapping display including: a panel that is transparent to light and is configured to display information on one surface of the panel, and a film adhered to cover the one surface of the panel on which the information is displayed, in which the film is adhered to the other surface of the panel opposite to the one surface in addition to the one surface of the panel, and an edge of the film is positioned at the other surface while the film covers an outermost periphery of the panel and extends around to the other surface.

According to an another aspect of the present disclosure, there is provided a film wrapping display including: a panel that is transparent to light and is configured to display information on one surface of the panel, a support frame configured to support the panel by being in contact with the other surface of the panel opposite to the one surface of the panel on which the information is displayed, and a film adhered to cover the one surface of the panel, in which the film is adhered to the support frame in addition to the one surface of the panel, and an edge of the film is positioned in a space on a side opposite to a side where a user who views the information displayed on the one surface of the panel exists while the film covers an outermost periphery of the panel and extends around to the space.

According to further another aspect of the present disclosure, there is provided a film wrapping display including: a panel that is transparent to light and configured to display information on one surface of the panel, a film adhered to cover the one surface of the panel on which the information is displayed, and a housing configured to cover the panel so as to expose the one surface of the panel, in which the film is adhered to the housing in addition to the one surface of the panel, and an edge of the film is positioned in a space on a side opposite to a side where a user who views the information displayed on the one surface of the panel exists while the film covers an outermost periphery of the housing and extends around to the space.

According to the present disclosure, in the film wrapping display, the scattering of the glass can be prevented even when the impact is applied to the glass and the glass is broken.

According to the present disclosure, in the film wrapping display, glass pieces can be prevented from scattering in a direction substantially parallel to the touch surface even when the impact is applied and the glass is broken.

According to the present disclosure, in the film wrapping display, the glass pieces scattered from the end surfaces of the glass can be prevented from scattering to an outer side of the housing even when the impact is applied to the panel and the glass is broken.

DETAILED DESCRIPTION OF THE EXEMPLARY EMBODIMENTS

Background for Achieving Aspect of Present Disclosure

Figure 1:
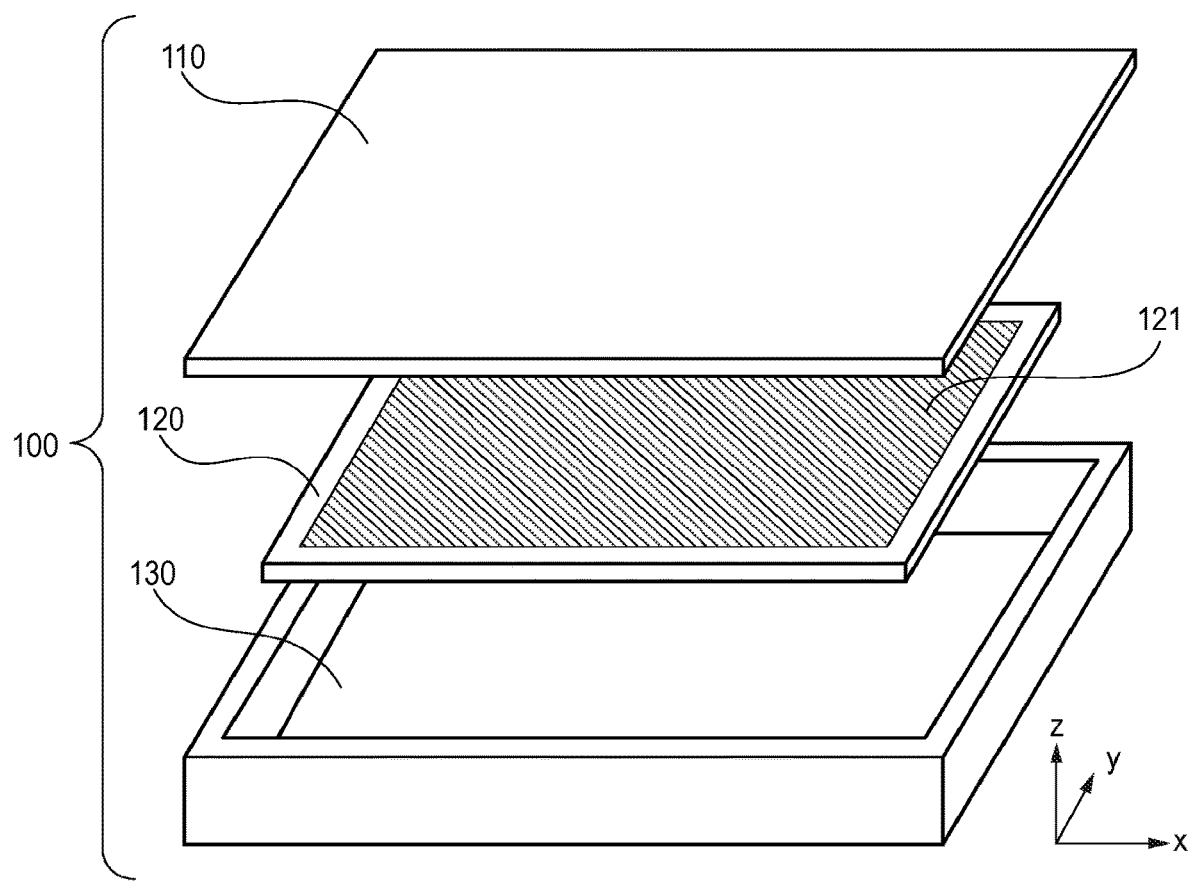
FIG. 1 is an exploded perspective view showing a configuration example of a flat panel provided with a touch panel.

In recent years, a flat panel having a touch panel is increasingly used as a display apparatus. FIG. 1 is an exploded perspective view showing a configuration example of a flat panel having a touch panel 110. FIG. 1 shows the configuration example of the flat panel having the touch panel 110. A display apparatus 100 includes the touch panel 110, a display device 120, and a housing 130. The display apparatus 100 is obtained by assembling these components.

Figure 2:
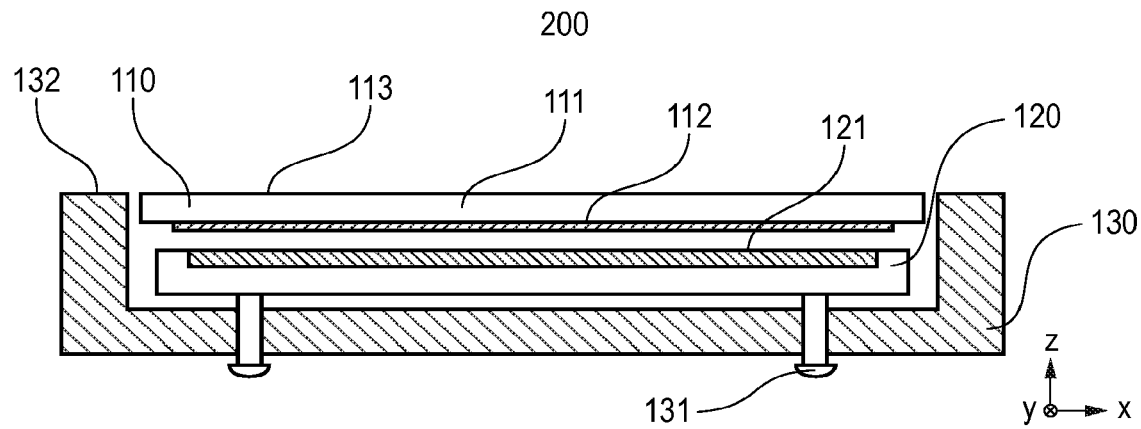
FIG. 2 is a cross-sectional view related to a display apparatus in an assembled state and cut in a direction perpendicular to the touch panel.

FIG. 2 is a cross-sectional view related to the display apparatus 100 in an assembled state and cut in a direction perpendicular to the touch panel 110. The touch panel 110 includes a cover glass 111 and a sensor glass 112. The sensor glass 112 is a glass having a function of a sensor that detects a touch operation performed by a user. Examples of the sensor glass 112 include a glass panel having, for example, a capacitive sensor that detects, by coating a thin conductive substance on a surface of a glass and causing a small amount of current to flow, a change in the current when the surface of the glass is touched and that identifies a touched position from an amount of the change. The cover glass 111 is a glass plate installed to protect the sensor glass 112 to improve durability of the touch panel 110 or to improve designability of an appearance. When the sensor glass 112 itself has sufficient durability, the cover glass 111 may not be used.

The display device 120 is a device that displays an image or a video by emitting light from an information display region 121 installed in a direction in which the touch panel 110 is provided. Examples of the display device 120 include a liquid crystal panel, an organic EL panel, and a seven-segment LED.

The display device 120 and the touch panel 110 may be bonded or adhered to each other by filling a gap therebetween with a resin.

This example shows a configuration in which the display device 120 is fixed to the housing 130 using screws 131. At this time, a height of an edge of housing 132 and a height of a touch surface 113 of the touch panel 110 are substantially the same, and an appearance is flat when viewed from the user, so that the designability is improved.

Figure 3:
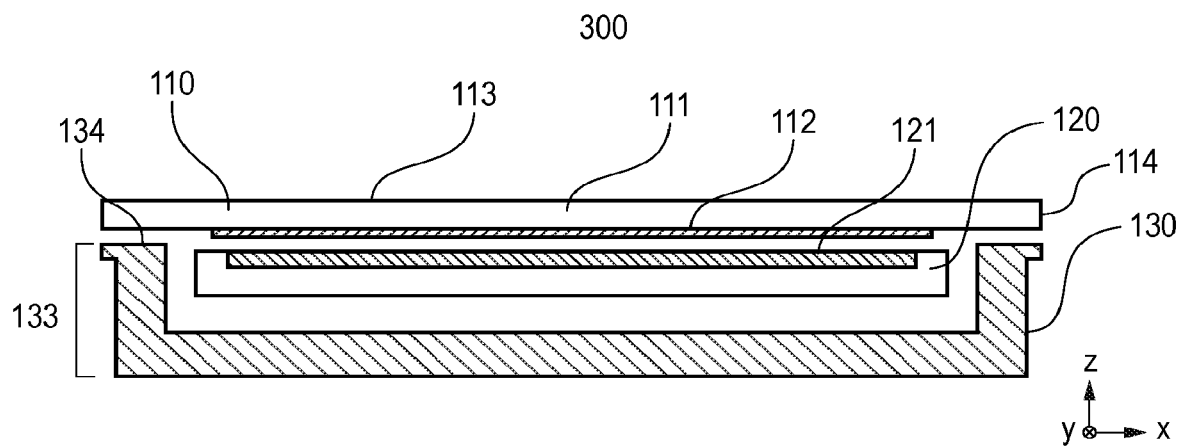
FIG. 3 is a cross-sectional view showing an example of a method for fixing the touch panel, a display device, and a housing, which is different from that of the configuration in FIG. 2.

FIG. 3 is a cross-sectional view showing an example of a method for fixing the touch panel 110, the display device 120, and the housing 130, which is different from that of the configuration in FIG. 2. FIG. 3 shows an example of a method for fixing the touch panel 110, the display device 120, and the housing 130, which is different from that of the configuration described above. In this example, side surfaces of the housing 130 function as a support frame 133. That is, the support frame 133 fixes the touch panel 110 by supporting a surface of the touch panel 110 opposite to the touch surface 113 of the touch panel 110. At this time, an edge 134 of the support frame is positioned on an inner side relative to end surfaces 114 of the cover glass 111 (center direction of the cover glass), so that since an appearance viewed from the user is only the cover glass 111, the designability can be further improved.

However, when the appearance viewed from the user is made flat by emphasizing a glass surface, a safety problem arises while improving the designability. Assuming that such display apparatuses 100, 200, and 300 are used for an aircraft display in an aircraft where a vibration is almost always generated. The cover glass 111 and the sensor glass 112 may be broken when the touch panel 110 receives an impact due to a head or an arm of the user colliding with the touch panel 110, and glass pieces may be scattered around.

Figure 4A:
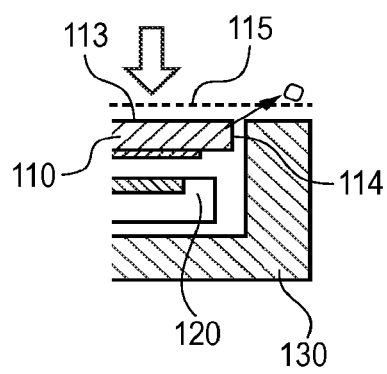
FIG. 4A is a configuration diagram of the display apparatus when a protective film is used on a surface of a cover glass in the configuration example shown in FIG. 2.
Figure 4B:
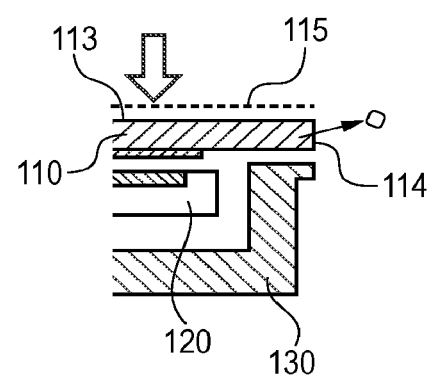
FIG. 4B is a configuration diagram of a display apparatus when the protective film is used on a surface of a cover glass in the configuration example shown in FIG. 3.

There is also a glass obtained by adhering a transparent protective film to a surface as a countermeasure against the scattering of the broken pieces. FIGS. 4A and 4B show configurations of the display apparatuses in a case where a protective film is used on a surface of the cover glass 111 in the configuration examples shown in FIGS. 2 and 3. A protective film 115 is adhered to the touch surface 113 of the cover glass 111 with an adhesive or the like. When the protective film 115 exists, even when the cover glass 111 is broken, the broken pieces can be prevented from scattering in a direction substantially perpendicular to the touch surface 113. However, the broken pieces cannot be prevented from scattering in a direction substantially parallel to the touch surface 113 from the end surfaces 114 of the glass.

Hereinafter, embodiments that specifically disclose a film wrapping display according to the present disclosure will be described in detail with reference to the drawings as appropriate. However, unnecessarily detailed description may be omitted. For example, detailed description of well-known matters and repeated description of substantially the same configurations may be omitted. This is to avoid unnecessary redundancy of the following description and to facilitate understanding of those skilled in the art. The accompanying drawings and the following description are provided for a thorough understanding of the present disclosure by those skilled in the art, which are not intended to limit the subject matter recited in the claims.

Embodiment 1

In the following embodiments, the film wrapping display according to the present disclosure is simply referred to as a "display apparatus".

Figure 5:
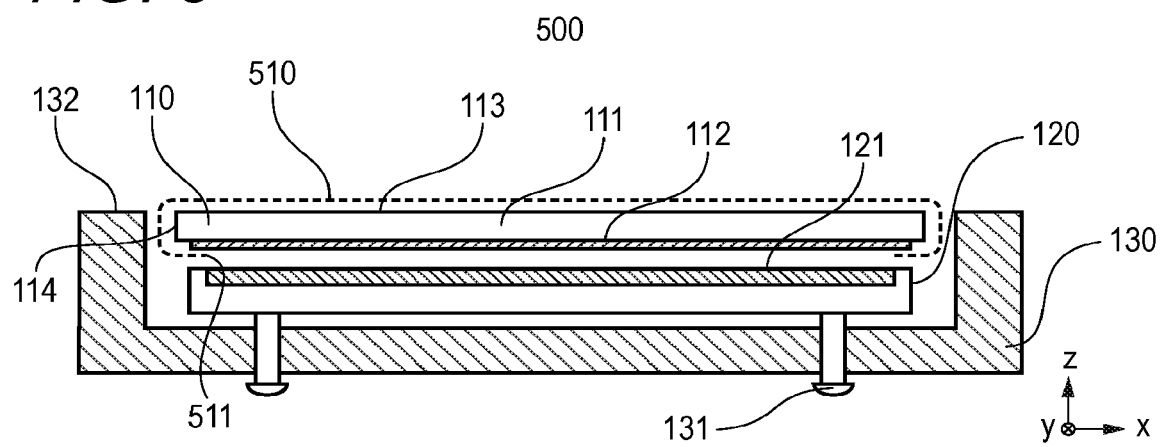
FIG. 5 is a cross-sectional view of a display apparatus according to an embodiment 1.

FIG. 5 is a cross-sectional view of a display apparatus 500 according to an embodiment 1. FIG. 5 shows the cross-sectional view of the display apparatus 500 according to the embodiment 1. In the display apparatus 500, a cross section is shown which is cut along a plane perpendicular to the touch panel 110. In FIG. 5, the same numerals are used as reference numerals for components having the same functions as those in the aspect described with reference to FIG. 2.

The display apparatus 500 according to the embodiment 1 includes the touch panel 110, the display device 120, and the housing 130. The display device 120 is, for example, a liquid crystal panel. In addition, although a substrate on which a circuit that controls the touch panel 110 and the display device 120 is mounted, wiring that connects modules, and the like are provided as components of the display apparatus 500, since description is complicated, description of configurations the substrate, the wiring that connects the modules, and the like will be omitted.

In the embodiment 1, the display device 120 is fixed to the housing 130 using the screws 131. The touch panel 110 is installed on a surface on a side where the information display region 121 of the display device 120 exists.

In the touch panel 110, the surface on the side where the information display region 121 exists is a touch surface 113 that is one surface, and a surface opposite to the one surface is the other surface. The touch panel 110 is provided with a protective glass including the touch surface 113 on at least one surface thereof. In the embodiment 1, the protective glass is the cover glass 111.

In the display apparatus 500, the cover glass 111 is provided on the touch panel 110, whereby the sensor glass 112 is protected, the durability of the touch panel 110 is improved, and the designability of the appearance is improved.

The display device 120 and the touch panel 110 are bonded to each other by filling a gap with a resin. Further, a film 510 is adhered to cover a surface of the touch panel 110 on a touch surface 113 side.

In the embodiment 1, the film 510, which is adhered to the touch surface 113 of the touch panel 110, also extends around to the end surfaces 114 of the cover glass 111 and is adhered to the end surfaces 114, and an edge 511 of the film 510 reaches a surface of the touch panel 110 on a side opposite to the touch surface 113.

The edge 511 of the film 510 is positioned to cover an outermost periphery of the touch panel 110 to extend around to the other surface.

Figure 6:
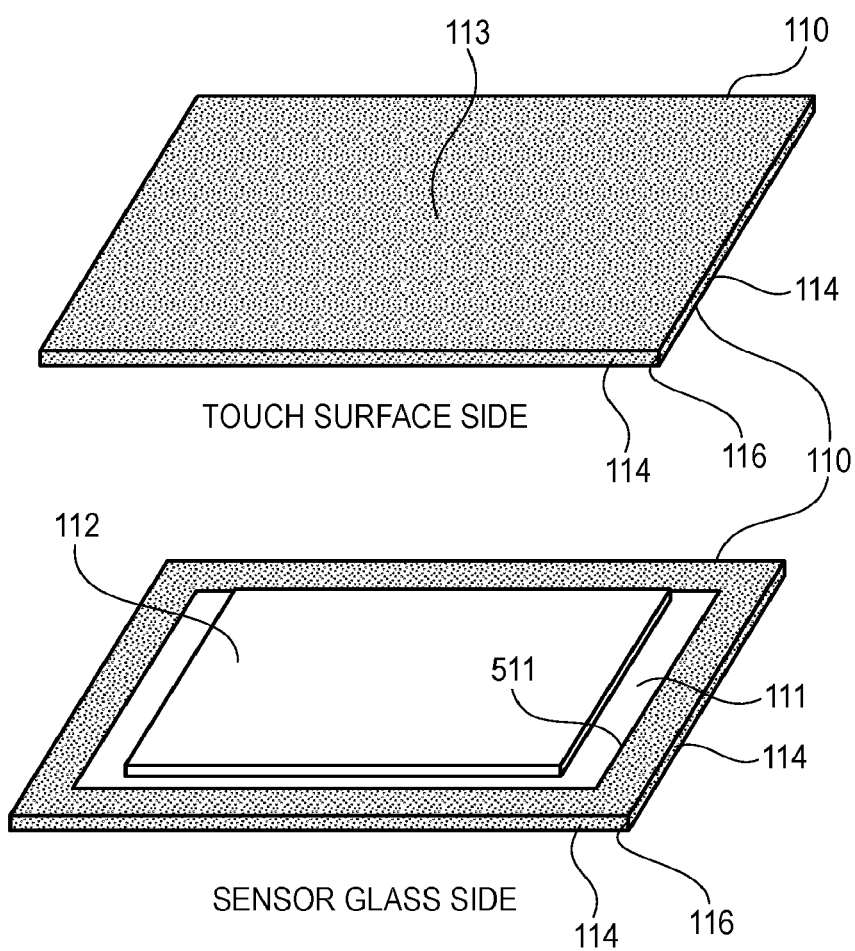
FIG. 6 is an exploded perspective view showing an entire image of the touch panel wrapped by a film.

In other words, the edge 511 of the film 510 is positioned on an inner side relative to the end surfaces 114 of the cover glass 111. FIG. 6 is an exploded perspective view showing an entire image of the touch panel wrapped with the film. FIG. 6 shows an entire image of the touch panel 110 wrapped by the film 510. The film 510 is adhered such that the film 510 covers a range indicated by dots in the drawing.

In the embodiment 1 shown in FIG. 6, the edge of the film 510 is adhered so as not to cover the sensor glass 112, but an extent to which the edge of the film 510 reaches may be determined regardless of a position with respect to the sensor glass 112. If the film 510, which extends around to the surface of the touch panel 110 opposite to the touch surface 113, is in a range in which the display device 120 does not hide the information display region 121 used for displaying a video or the like, an extent to which the film 510 covers the surface of the touch panel 110 opposite to the touch surface 113 may be freely determined. For example, in the touch panel 110 where the touch surface 113 is covered by the film 510, an edge portion 116 where the adjacent end surfaces 114 intersect each other is covered by the continuous film 510. Further, in the touch panel 110, in addition to the edge portion 116, a part of the other surface may be further covered by the continuous film 510.

Figure 7:
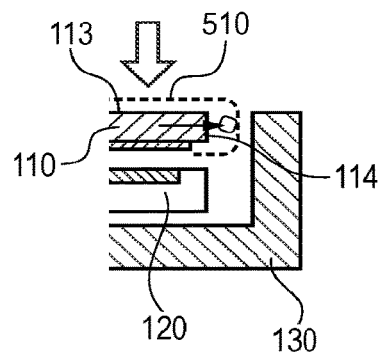
FIG. 7 is a cross-sectional view of main parts illustrating a situation where glass pieces can be prevented from scattering in the embodiment 1.

In this way, the film 510 is continuously adhered from the touch surface 113 of the touch panel 110 also to the end surfaces 114 of the cover glass, and the edge 511 of the film 510 reaches the surface of the touch panel 110 opposite to the touch surface 113, so that even when an impact is applied to the touch panel 110 and the cover glass 111 is broken, glass pieces can be prevented from scattering in a direction substantially parallel to the touch surface 113 (see FIG. 7). FIG. 7 is a cross-sectional view of main parts illustrating a situation where the glass pieces can be prevented from scattering in the embodiment 1.

Figure 8A:
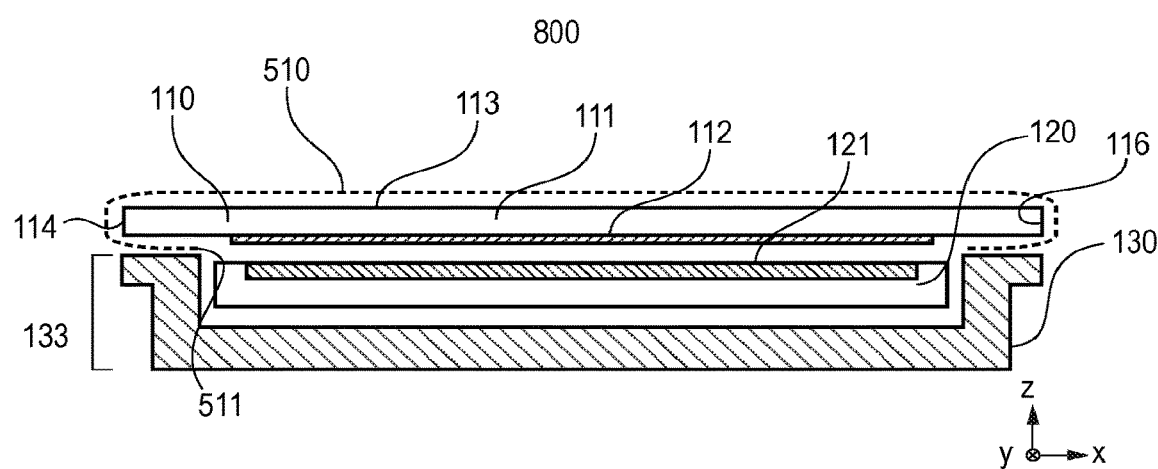
FIG. 8A is a cross-sectional view of a configuration example in which side surfaces of a housing function as a support frame.

In the embodiment 1 shown in FIG. 5, the display device 120 is configured to be fixed to the housing 130, but this is an example of a structure, and the structure is not necessarily required. For example, as another configuration, there is a configuration shown in FIG. 8. FIG. 8A is a cross-sectional view of a configuration example in which side surfaces of a housing function as a support frame.

In a display apparatus 800 according to the embodiment 1 shown in FIG. 8A, side surfaces of the housing 130 function as the support frame 133. That is, the support frame 133 fixes the touch panel 110 by supporting the touch panel 110 from a surface opposite to the touch surface 113.

Figure 8B:
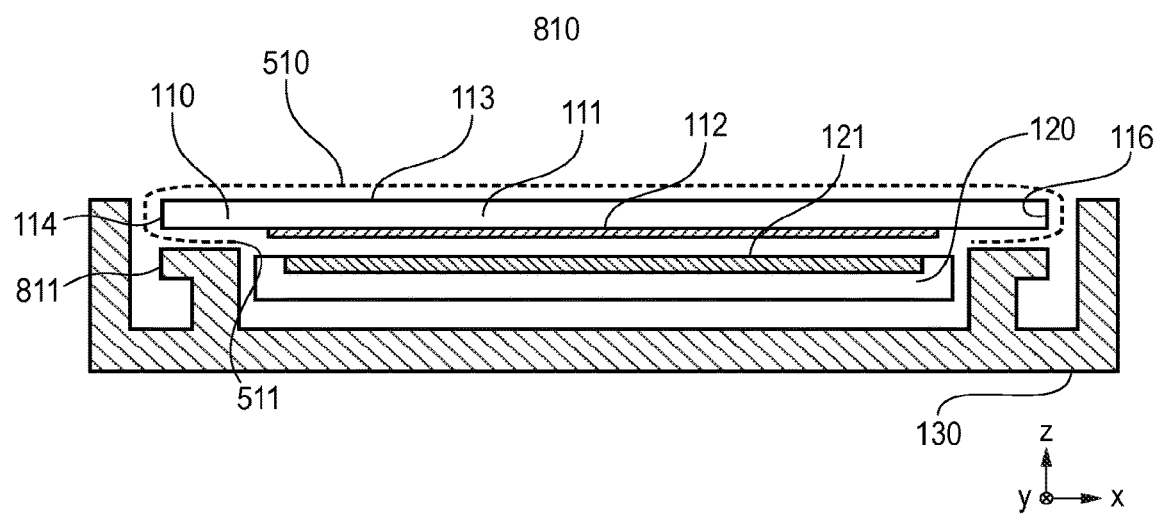
FIG. 8B is a cross-sectional view of a configuration example in which a support frame is provided separately from a housing.

FIG. 8B is a cross-sectional view of a configuration example in which a support frame is provided separately from a housing. Further, in a display apparatus 810 according to the embodiment 1 shown in FIG. 8B, a support frame 811 is provided separately from the housing 130. The support frame 811 is on an inner side of the housing 130 and supports the touch panel 110 from a surface opposite to the touch surface 113, thereby fixing the touch panel 110. The support frame 811 may be a portion integrally molded with the housing 130. Further, the support frame 811 may be a component separate from the housing 130, and may be configured to be fixed to the housing 130 by screwing or fitting.

Figure 8C:
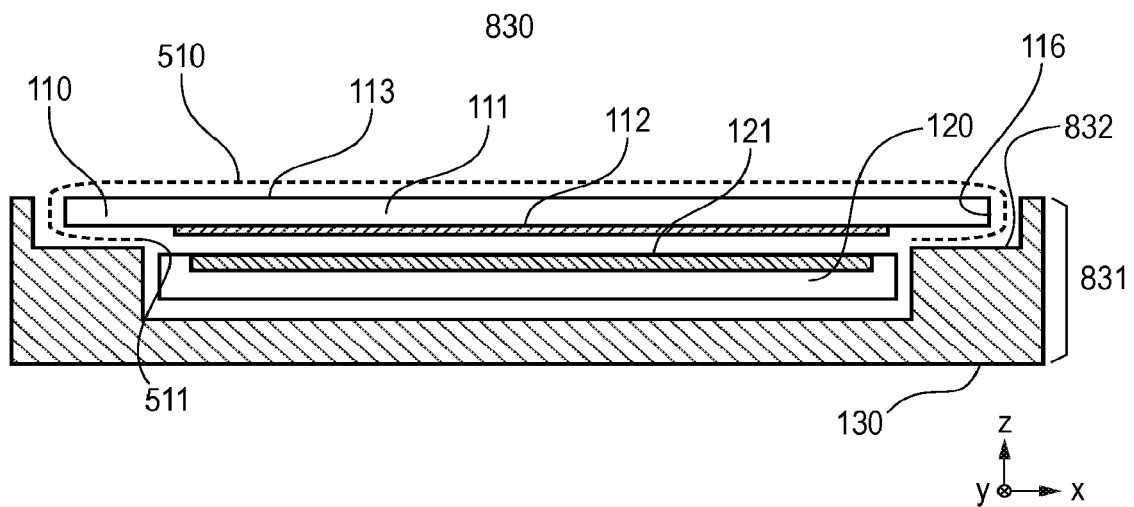
FIG. 8C is a cross-sectional view of a configuration example in which a step is provided on side surfaces of a housing.

FIG. 8C is a cross-sectional view of a configuration example in which a step is provided on side surfaces of a housing. Further, in a display apparatus 830 according to the embodiment 1 shown in FIG. 8C, a step 832 is provided on side surfaces 831 of the housing 130, and the step 832 supports the touch panel 110 from a surface opposite to the touch surface 113, thereby fixing the touch panel 110.

Figure 8D:
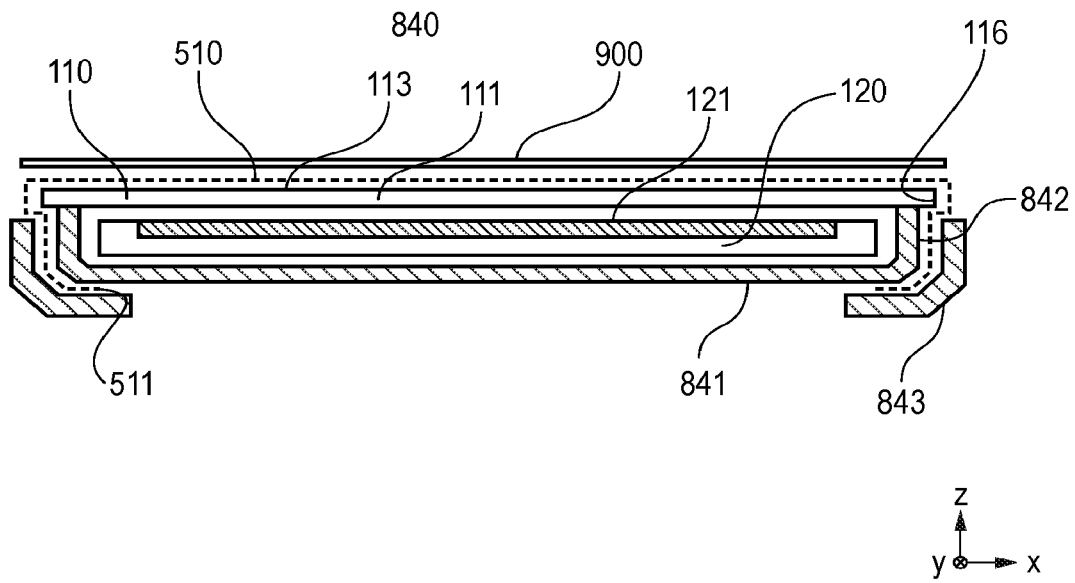
FIG. 8D is a cross-sectional view of a configuration example in which a film extends around to a back surface of a support frame and is adhered thereto.

FIG. 8D is a cross-sectional view of a configuration example in which a film extends around to a back surface of a support frame and is adhered thereto. Further, in the display apparatus 840 according to the embodiment 1 shown in FIG. 8D, the film 510 extends around to a back surface of a support frame 841 and is adhered thereto. A maximum outer shape of the support frame 841 is formed smaller than a maximum outer shape of the touch panel 110. A cover 843, which hides the film 510 adhered to side surfaces 842 of the support frame 841, is disposed on an outer side of the support frame 841. The cover 843 is attached to the support frame 841 by a method such as screwing, fitting, or gluing, and is disposed such that the user cannot visually recognize the edge 511 of the film 510 when viewing an appearance of the display apparatus. In the display apparatus 840, a functional film 900 is adhered to a surface of the film 510 on a side opposite to the touch panel 110. The functional film 900 will be described below.

According to the display apparatus 840, since the film 510 extends around to the back surface of the support frame 841 and is adhered thereto, even when an impact is applied to the touch panel 110 and the cover glass 111 is broken, glass pieces are less likely to scatter in a direction substantially parallel to the touch surface 113. Since the edge 511 is sandwiched between a side surface 842 of the support frame 841 and the cover 843, an anchor effect is generated and the film 510 is less likely to be pulled out.

Here, for example, in a display apparatus disclosed in JP-A-2006-221058, a film is adhered only to side surfaces of a rear cover. Therefore, there is no anchor effect, and an edge is likely to turn up. Further, the rear cover is larger than a display portion. Therefore, a peeling portion is easily visible on a front surface. Further, an outermost periphery of a film is not covered by the cover. Therefore, the peeling portion, a crease portion, or a film cut portion is easily appeared.

On the contrary, according to the display apparatus 840, since the maximum outer shape of the support frame 841 is smaller than the maximum outer shape of the touch panel 110, the edge 511 can be hidden and protected. In addition, a portion where peeling is likely to be generated in a reliability test can be hidden in a position invisible to the user (on a back surface side of the touch panel 110).

According to the display apparatus 840, since the film 510 adhered to the side surfaces 842 of the support frame 841 is covered by the cover 843, a side surface portion where the film is likely to be peeled off during the reliability test can be hidden. Further, the film 510 adhered to the side surfaces 842 is covered by the cover 843, whereby molding marks such as a crease and the film cut portion when adhering is performed by 3D molding can be hidden.

In any one of the embodiments 1 shown in FIGS. 8A, 8B, 8C, and 8D, the film 510 adhered to the touch panel 110 is also adhered to the end surfaces 114 of the cover glass, and the edge 511 of the film 510 reaches the surface of the touch panel 110 opposite to the touch surface 113. In other words, the edge 511 of the film 510 is positioned on the inner side relative to the end surfaces 114 of the cover glass 111. This point is the same as that of the embodiment 1 in FIG. 5.

In the embodiments 1 described using FIGS. 5 and 8, the touch panel 110 includes the cover glass 111 and the sensor glass 112. However, when the sensor glass 112 has sufficient durability, the touch panel 110 can only include the sensor glass 112 without using the cover glass 111. In this case, the film 510 is continuously adhered to a touch surface, end surfaces, and a surface opposite to the touch surface of the sensor glass 112. Accordingly, when an impact is applied and the sensor glass 112 is broken, glass pieces are prevented from scattering from the end surfaces of the sensor glass 112.

Figure 9:
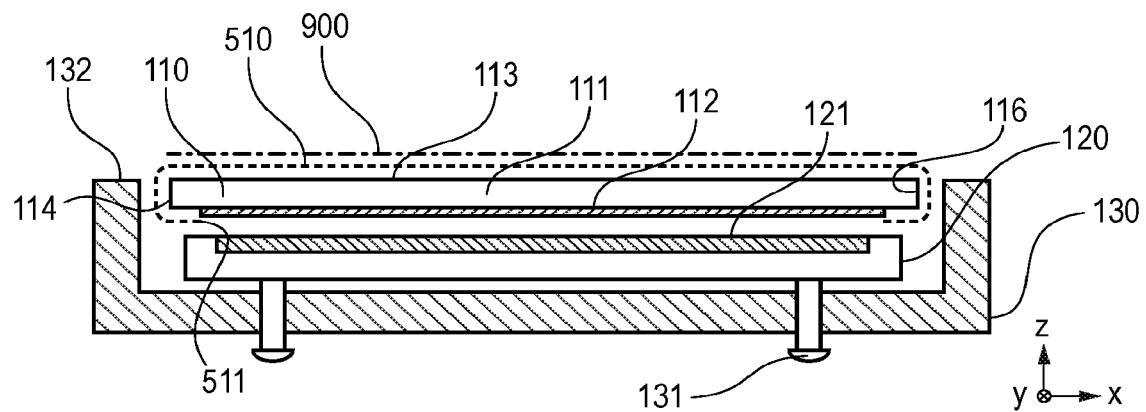
FIG. 9 is a cross-sectional view of a configuration example in which a functional film is adhered to a surface of a film opposite to a surface facing a touch panel.

In the embodiments 1 described using FIGS. 5 and 8, although it has been described that only the film 510 is adhered to the touch surface 113 of the touch panel 110, there may be no need to do so. FIG. 9 is a cross-sectional view of a configuration example in which a functional film is adhered to a surface of a film opposite to a surface facing a touch panel. As shown in FIG. 9, the functional film 900 may be adhered to a surface of the film 510 opposite to a surface facing the touch panel 110. Here, the functional film is, for example, a film having a function such as anti-glare that diffuses ambient light, anti-reflection that reduces reflection of the ambient light, and anti-fingerprint that prevents fixation of fat and oil.

Accordingly, it is possible to improve video quality displayed on a video device and improve usability. For example, an anti-glare film that is the functional film 900 is adhered to a surface of the film 510 on a side opposite to the touch panel 110, thereby diffusing light into particles mixed in the anti-glare film, so that visibility of a screen can be prevented from decreasing. The functional film may be installed to be sandwiched between the touch surface 113 of the touch panel 110 and the film 510.

(Regarding Type of Film)

Properties of the film 510 adhered to the touch panel 110 in the present disclosure will be described below.

The film 510 is a film that can be bent by applying a force or heat, and has properties of transmitting light emitted from the display device 120. Examples of materials include polycarbonate (PC), acrylic resin (PMMA), polyethylene terephthalate (PET), polytetrafluoroethylene (PTFE), and polyvinyl chloride (PVC). These materials formed into films having a thickness of several millimeters to several microns are used.

A surface shape of the film 510 is processed, or a coating is applied to the surface of the film 510, whereby the film 510 may have a specific function. For example, the film itself may have a function such as anti-glare that diffuses ambient light, anti-reflection that reduces reflection of the ambient light, and anti-fingerprint that prevents fixation of fat and oil.

(Regarding Bonding of Film)

The film 510 in the present disclosure is adhered to the touch panel 110. A method for adhering will be described below.

An adhesive is applied to an adhering surface of the film 510, and the film 510 is adhered to the touch panel 110 by an adhesive force of the adhesive. In order to prevent a gap from being generated between the film 510 and the touch panel 110, it is preferable to use a method such as three dimension overlay method (TOM) molding for adhering work. However, the TOM-molding is an example of the adhering method. As long as the adhering is performed without a gap, another method such as water-pressure transfer or thermal contraction may be used, or the film may be adhered manually. Further, the touch panel 110 is immersed in a water tank filled with a resin cured by drying or cooling, whereby the film may be molded on the surface of the touch panel 110.

Embodiment 2

Figure 10:
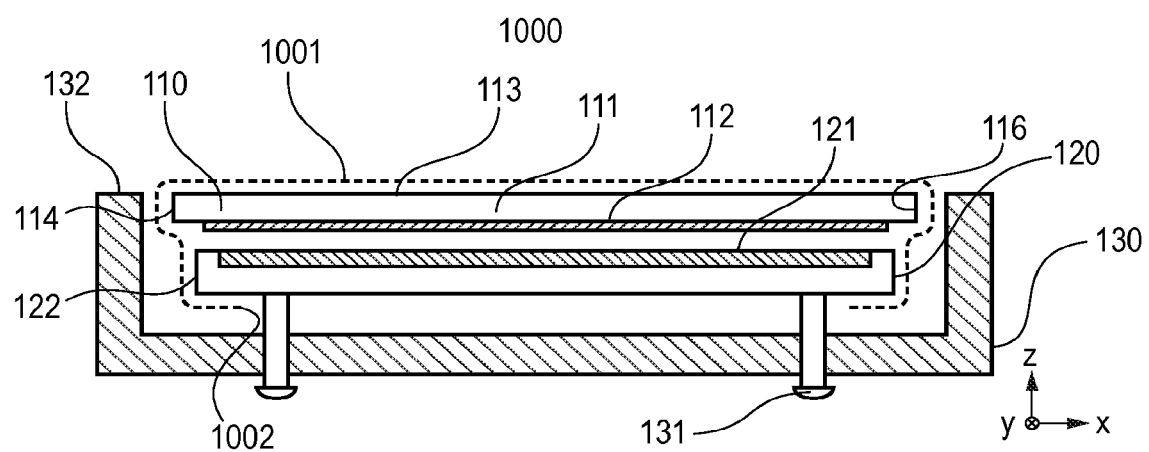
FIG. 10 is a cross-sectional view of a display apparatus according to an embodiment 2.

FIG. 10 is a cross-sectional view of a display apparatus according to an embodiment 2. FIG. 10 shows a cross-sectional view of a display apparatus 1000 according to the embodiment 2. In the display apparatus 1000, a cross section is shown which is cut along a plane perpendicular to the touch panel 110. In FIG. 10, the same numerals are used as reference numerals for components having the same functions as those in the embodiment 1 described with reference to FIG. 5.

The display apparatus 1000 according to the embodiment 2 includes the touch panel 110, the display device 120, and the housing 130. In addition, although a substrate on which a circuit that controls the touch panel 110 and the display device 120 is mounted, wiring that connects modules, and the like may be components of the display apparatus 1000, description thereof will be omitted because the description is complicated as in the embodiment 1.

In the embodiment 2, the display device 120 is fixed to the housing 130 using the screws 131. The touch panel 110 is installed on a surface on a side where the information display region 121 of the display device 120 exists. The display device 120 and the touch panel 110 are bonded to each other by adhering with an adhesive or by filling a gap with a resin. Further, a film 1001 is adhered to cover a surface of the touch panel 110 on a touch surface 113 side. Further, the film 1001 also extends around to the end surfaces 114 of the cover glass 111 and is adhered thereto, and the film 1001 is also adhered to end surfaces 122 of the display device 120.

In the embodiment 2 shown in FIG. 10, an edge 1002 of the film 1001 reaches a surface of the display device 120 opposite to the information display region 121. In other words, the edge 1002 of the film 1001 is positioned on an inner side relative to the end surfaces 114 of the cover glass 111. However, it is not always necessary to adhere the film to that position. If the film 1001 covers a part of the display device 120, a certain effect is achieved.

In this way, when the film 1001 is continuously adhered from the touch surface 113 of the touch panel 110 also to the end surfaces of the cover glass, and is further continuously adhered to the display device, even when an impact is applied to the touch panel 110 and the cover glass 111 is broken, glass pieces can be prevented from scattering in a direction substantially parallel to the touch surface 113.

Further, if the film 1001 is adhered such that the edge 1002 of the film 1001 is positioned on the inner side relative to the end surfaces 114 of the cover glass 111 as in the present embodiment, when the impact is applied to the touch panel 110 and the touch panel 110 is deformed, the edge 1002 of the film 1001 can be prevented from being peeled off from the display device 120. This is because resistance when the film 1001 is pulled in a positive direction of a Z-axis increases.

The method for fixing the touch panel 110 and the display device 120 is not limited to the configuration shown in FIG. 10, which is the same as that of the embodiment 1. Further, when the sensor glass 112 has sufficient durability, the touch panel 110 can only include the sensor glass 112 without using the cover glass 111, and a functional film may be adhered to a surface of the film 1001 opposite to a surface facing the touch panel 110, which are the same as those of the embodiment 1. A type and a bonding method of the film 1001 are the same as those of the embodiment 1.

Embodiment 3

Figure 11:
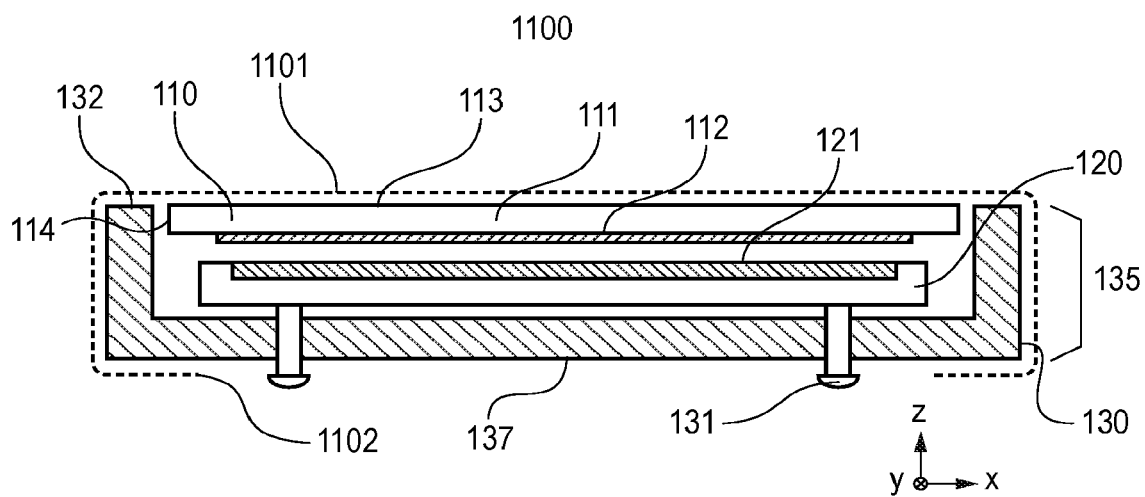
FIG. 11 is a cross-sectional view of a display apparatus in an embodiment 3.

FIG. 11 is a cross-sectional view of a display apparatus in an embodiment 3. FIG. 11 shows a cross-sectional view of a display apparatus 1100 in the embodiment 3. In the display apparatus 1100, a cross section is shown which is cut along a plane perpendicular to the touch panel 110. In FIG. 11, the same numerals are used as reference numerals for components having the same functions as those in the embodiment 1 described with reference to FIG. 5.

The display apparatus 1100 according to the embodiment 3 includes the touch panel 110, the display device 120, and the housing 130. In addition, although a substrate on which a circuit that controls the touch panel 110 and the display device 120 is mounted, wiring that connects modules, and the like may be components of the display apparatus 1100, description thereof will be omitted because the description is complicated as in the embodiment 1.

In the embodiment 3, the display device 120 is fixed to the housing 130 using the screws 131. The touch panel 110 is installed on a surface on a side where the information display region 121 of the display device 120 exists. The display device 120 and the touch panel 110 are bonded to each other by filling a gap with a resin.

A height of the edge of housing 132 and a height of the touch surface 113 of the touch panel 110 are fixed to be substantially the same, and an appearance is flat when viewed from the user, thereby improving the designability.

In the embodiment 3, the film 1101 is adhered to cover a surface of the touch panel 110 on a touch surface 113 side. Further, the film 1101 is continuous with the touch surface 113 of the touch panel 110, also adhered to the edge of housing 132, and also extends around to side surfaces 135 of the housing and is adhered thereto.

In the embodiment 3 shown in FIG. 11, an edge 1102 of the film 1101 reaches a surface of the housing 130 opposite to a surface where the touch panel 110 is installed.

That is, the edge 1102 of the film 1101 covers an outermost periphery of the housing to sandwich the touch panel 110, and is positioned to extend around to a space on a side opposite to a side where the user who views information exists.

In other words, the edge 1102 of the film 1101 is positioned on an inner side relative to the side surfaces 135 of the housing 130 (in a direction toward a center of the housing when viewed from a side surface). However, it is not always necessary to adhere the film to that position. If the film 1101 covers a part of the housing 130, a certain effect is achieved.

In this way, when the film 1101 is continuously adhered from the touch surface 113 of the touch panel 110 also to the housing 130, even when an impact is applied to the touch panel 110 and the cover glass 111 is broken, glass pieces scattered from end surfaces of the cover glass 111 can be prevented from scattering to an outer side of the housing 130.

Further, if the film 1101 is adhered such that the edge 1102 of the film 1101 is positioned on the inner side relative to the side surfaces 135 of the housing 130 as in the embodiment 3, when the impact is applied to the touch panel 110 and the touch panel 110 is deformed, the edge 1102 of the film 1101 can be prevented from being peeled off from the housing 130. This is because resistance when the film 1101 is pulled in a positive direction of a Z-axis increases.

The method for fixing the touch panel 110 and the display device 120 is not limited to the configuration shown in FIG. 11, which is the same as that of the embodiment 1. Further, when the sensor glass 112 has sufficient durability, the touch panel 110 can only include the sensor glass 112 without using the cover glass 111, and a functional film may be adhered to a surface of the film 1101 opposite to a surface facing the touch panel 110, which are the same as those of the embodiment 1. A type and a bonding method of the film 1101 are the same as those of the embodiment 1.

Figure 12:
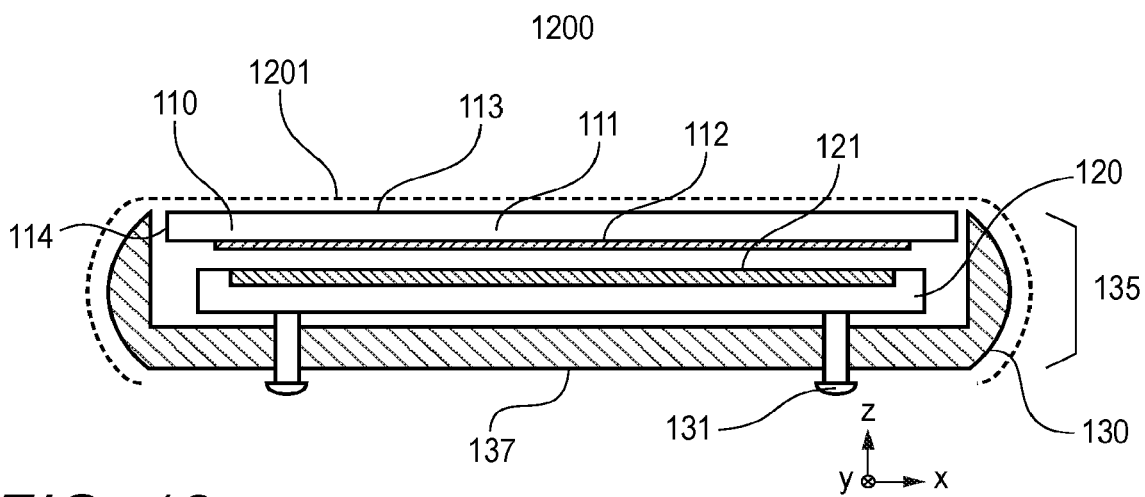
FIG. 12 is a cross-sectional view of a configuration example in which a thickness of side surfaces of a housing in the vicinity of end surfaces of a touch panel is reduced.

Although a height of the edge of housing 132 and a height of the touch surface of the touch panel 110 are fixed to be substantially the same in the embodiment 3, there is no need to have an edge on the housing. FIG. 12 is a cross-sectional view of a configuration example in which a thickness of side surfaces of a housing in the vicinity of end surfaces of the touch panel 110 is reduced. As shown in FIG. 12, a thickness of side surfaces of the housing 130 in the vicinity of the end surfaces 114 of the touch panel 110 is reduced, whereby an effect of making an appearance flat as in the embodiment 3 can be exhibited. In this case, a film 1201 is continuously adhered from the touch surface 113 of the touch panel 110 to the side surfaces 135 of the housing.

Figure 13:
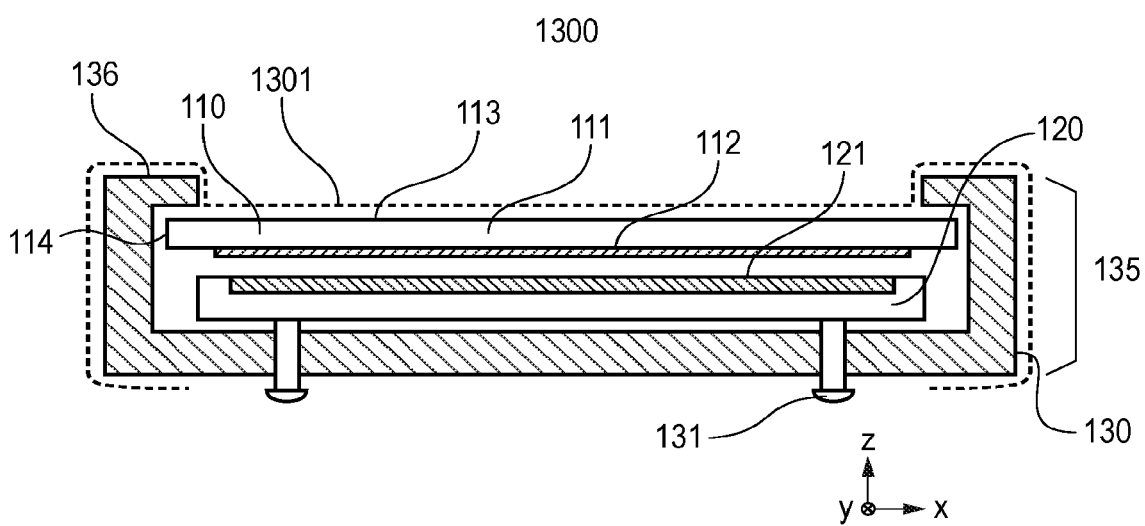
FIG. 13 is a cross-sectional view of a configuration example in which side surfaces of a housing form a bezel.

In the embodiment 3, a height of the edge of housing 132 and a height of the touch surface of the touch panel 110 are fixed to be substantially the same, which is a request from an aesthetic viewpoint. If design constraints permit, the height of the edge of housing 132 and the height of the touch surface of the touch panel 110 do not necessarily have to be aligned. FIG. 13 is a cross-sectional view of a configuration example in which side surfaces of a housing form a bezel. Further, as shown in FIG. 13, the side surfaces 135 of the housing 130 may be shaped to hang over the touch surface 113 of the touch panel 110 to form a bezel 136. In this case, a film 1301 is continuously adhered from the touch surface 113 of the touch panel 110 to the bezel 136 of the housing, and is further continuously adhered to the side surfaces 135.

Embodiment 4

Figure 14A:
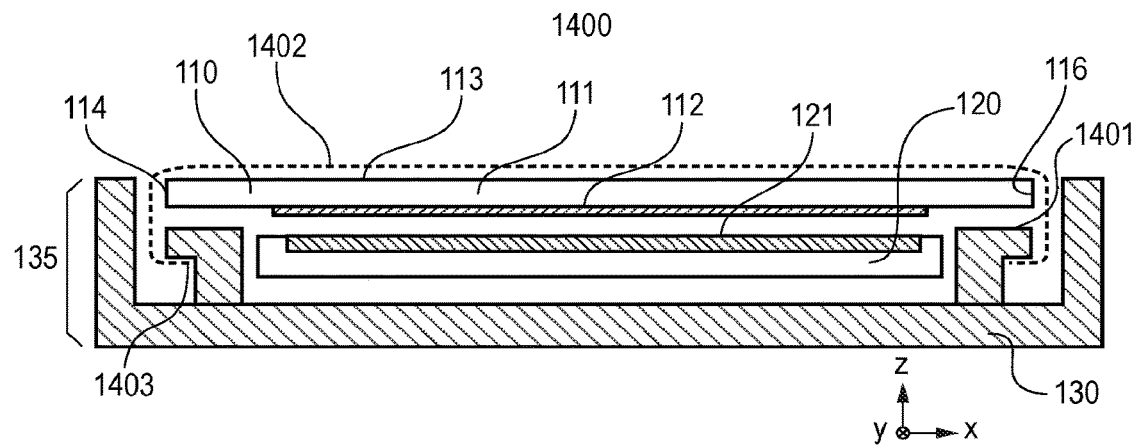
FIG. 14A is a cross-sectional view of a display apparatus according to an embodiment 4.

FIG. 14A is a cross-sectional view of a display apparatus according to an embodiment 4. FIG. 14A shows a cross-sectional view of a display apparatus 1400 in the embodiment 4. In the display apparatus 1400, a cross section is shown which is cut along a plane perpendicular to the touch panel 110. In FIG. 14A, the same numerals are used as reference numerals for components having the same functions as those in the embodiment 1 described with reference to FIG. 5.

The display apparatus 1400 according to the embodiment 4 includes the touch panel 110, the display device 120, the housing 130, and a support frame 1401. In addition, although a substrate on which a circuit that controls the touch panel 110 and the display device 120 is mounted, wiring that connects modules, and the like may be components of the display apparatus 1400, description thereof will be omitted because the description is complicated as in the embodiment 1.

In the embodiment 4, the support frame 1401 is on an inner side of the housing 130 and supports the touch panel 110 from a surface opposite to the touch surface 113, thereby fixing the touch panel 110. The support frame 1401 may be a portion integrally molded with the housing 130. Further, the support frame 1401 may be a component separate from the housing 130, and may be configured to be fixed to the housing 130 by screwing or fitting. Although the housing 130 is a component in the embodiment 4, the housing 130 is not an essential component. When the display apparatus 1400 is installed by directly attaching the support frame 1401 to a wall surface and the like, the housing 130 is unnecessary.

The touch panel 110 is installed on a surface on a side where the information display region 121 of the display device 120 exists. The display device 120 and the touch panel 110 are bonded to each other by adhering with an adhesive or by filling a gap with a resin.

In the embodiment 4, a film 1402 is adhered to cover a surface of the touch panel 110 on a touch surface 113 side. Further, the film 1402 is continuous with the touch surface 113 of the touch panel 110, also adhered to the end surfaces 114 of the cover glass 111, and also adhered to the support frame 1401. An edge 1403 of the film 1402 covers an outermost periphery of the touch panel 110 to sandwich the touch panel 110, and is positioned to extend around to a space on a side opposite to a side where the user who views information exists.

In the embodiment 4 shown in FIG. 14A, the edge 1403 of the film 1402 is positioned on an inner side relative to the end surfaces 114 of the cover glass 111. However, it is not always necessary to adhere the film to that position. If the film 1402 covers a part of the support frame 1401, a certain effect is achieved.

In this way, when the film 1402 is continuously adhered from the touch surface 113 of the touch panel 110 also to the end surfaces 141 of the cover glass 111, and is continuously adhered to the support frame, even when an impact is applied to the touch panel 110 and the cover glass 111 is broken, glass pieces can be prevented from scattering in a direction substantially parallel to the touch surface 113.

Further, if the film 1402 is adhered such that the edge 1403 of the film 1402 is positioned on the inner side relative to the end surfaces 114 of the cover glass 111 as in the embodiment 4, when the impact is applied to the touch panel 110 and the touch panel 110 is deformed, the edge 1403 of the film 1402 can be prevented from being peeled off from the support frame 1401. This is because resistance when the film 1402 is pulled in a positive direction of a Z-axis increases.

When the sensor glass 112 has sufficient durability, the touch panel 110 can only include the sensor glass 112 without using the cover glass 111, and a functional film may be adhered to a surface of the film 1402 opposite to a surface facing the touch panel 110, which are the same as those of the embodiment 1. A type and a bonding method of the film 1402 are the same as those of the embodiment 1.

The housing 130 does not necessarily have to be an item having a container-like shape as shown in FIG. 14A, and may be a concave portion provided on a wall surface or the like.

Figure 14B:
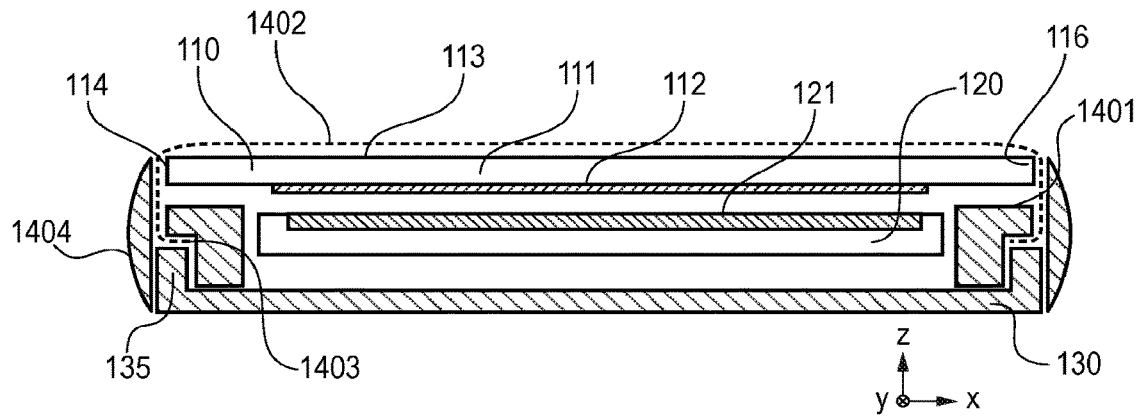
FIG. 14B is a cross-sectional view of a configuration example in which a cover is installed on an outer side of a housing.

In the embodiment 4, the side surfaces 135 of the housing 130 are arranged such that the user cannot visually recognize the edge 1403 of the film 1402 when viewing an appearance of the display apparatus 1400. Accordingly, it is possible to prevent a boundary between a place where the film 1402 is adhered and a place where the film 1402 is not adhered from being visible and impairing aesthetics, and to prevent the film 1402 from being peeled off from the edge 1403. FIG. 14B shows an example of an embodiment achieving the same effect as the above. FIG. 14B is a cross-sectional view of a configuration example in which a cover is installed on an outer side of a housing. In the embodiment of FIG. 14B, a height of the side surfaces 135 of the housing is smaller than that of the edge 1403 of the film 1402, and it cannot be said that the edge 1403 of the film 1402 is invisible to the user. Instead, a cover 1404 is installed on an outer side of the housing. The cover 1404 is attached to the housing 130 by a method such as screwing, fitting, or gluing, and is disposed such that the user cannot visually recognize the edge 1403 of the film 1402 when viewing an appearance of the display apparatus.

Embodiment 5

Figure 15:
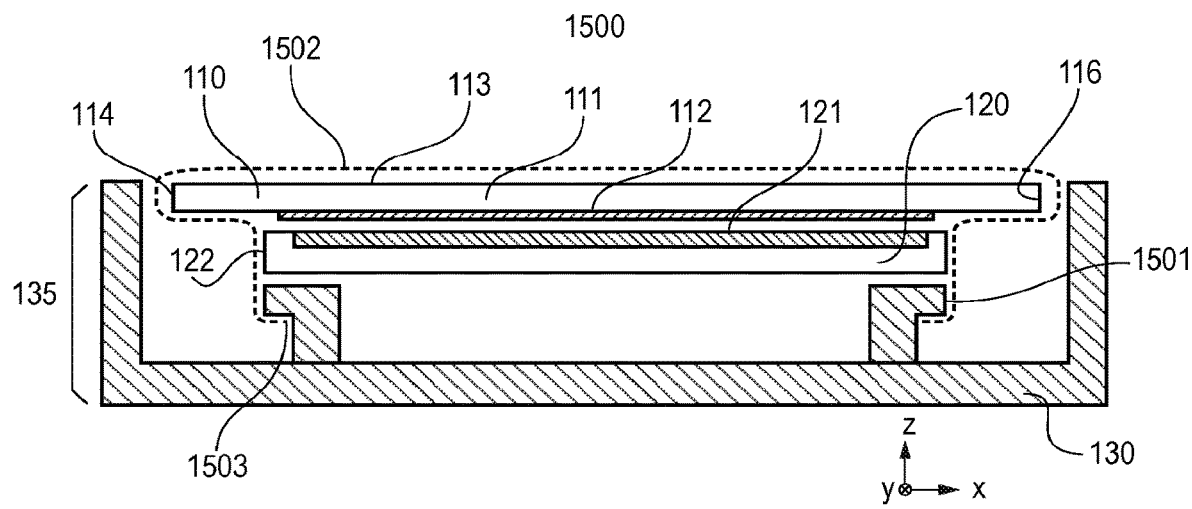
FIG. 15 is a cross-sectional view of a display apparatus according to an embodiment 5.

FIG. 15 is a cross-sectional view of a display apparatus according to an embodiment 5. FIG. 15 shows a cross-sectional view of a display apparatus 1500 in the embodiment 5. In the display apparatus 1500, a cross section is shown which is cut along a plane perpendicular to the touch panel 110. In FIG. 15, the same numerals are used as reference numerals for components having the same functions as those in the embodiment 1 described with reference to FIG. 5.

The display apparatus 1500 according to the embodiment 5 includes the touch panel 110, the display device 120, the housing 130, and a support frame 1501. In addition, although a substrate on which a circuit that controls the touch panel 110 and the display device 120 is mounted, wiring that connects modules, and the like may be components of the display apparatus 1500, description thereof will be omitted because the description is complicated as in the embodiment 1.

In the embodiment 5, the support frame 1501 is on an inner side of the housing 130 and supports the display device 120 from a surface opposite to the information display region 121, thereby fixing the display device 120. The support frame 1501 may be a portion integrally molded with the housing 130. Further, the support frame 1501 may be a component separate from the housing 130, and may be configured to be fixed to the housing 130 by screwing or fitting. Although the housing 130 is a component in the embodiment 5, the housing 130 is not an essential component. When the display apparatus 1500 is installed by directly attaching the support frame 1501 to a wall surface and the like, the housing 130 is unnecessary.

The touch panel 110 is installed on a surface on a side where the information display region 121 of the display device 120 exists. The display device 120 and the touch panel 110 are bonded to each other by filling a gap with a resin.

In the embodiment 5, a film 1502 is adhered to cover a surface of the touch panel 110 on a touch surface 113 side. Further, the film 1502 is continuous with the touch surface 113 of the touch panel 110, also adhered to the end surfaces 114 of the cover glass 111, adhered to the end surfaces 122 of the display device 120, and also adhered to the support frame 1501.

In the embodiment 5 shown in FIG. 15, an edge 1503 of the film 1502 is positioned on an inner side relative to the end surfaces 114 of the cover glass 111. However, it is not always necessary to adhere the film to that position. If the film 1502 covers a part of the support frame 1501, a certain effect is achieved.

In this way, when the film 1502 is continuously adhered from the touch surface 113 of the touch panel 110 to the end surfaces 114 of the cover glass 111, adhered to the end surfaces 122 of the display device 120, and also adhered to the support frame 1501, even when an impact is applied to the touch panel 110 and the cover glass 111 is broken, glass pieces can be prevented from scattering in a direction substantially parallel to the touch surface 113.

Further, if the film 1502 is adhered such that the edge 1503 of the film 1502 is positioned on the inner side relative to the end surfaces 114 of the cover glass 111 as in the embodiment 5, when the impact is applied to the touch panel 110 and the touch panel 110 is deformed, the edge 1503 of the film 1502 can be prevented from being peeled off from the support frame 1501. This is because resistance when the film 1502 is pulled in a positive direction of a Z-axis increases.

When the sensor glass 112 has sufficient durability, the touch panel 110 can only include the sensor glass 112 without using the cover glass 111, and a functional film may be adhered to a surface of the film 1502 opposite to a surface facing the touch panel 110, which are the same as those of the embodiment 1. A type and a bonding method of the film 1502 are the same as those of the embodiment 1.

In the embodiment 5, the side surfaces 135 of the housing 130 are arranged such that the user cannot visually recognize the edge 1503 of the film 1502 when viewing an appearance of the display apparatus 1500. Accordingly, it is possible to prevent a boundary between a place where the film 1502 is adhered and a place where the film 1502 is not adhered from being visible and impairing aesthetics, and to prevent the film 1502 from being peeled off from the edge 1503.

The housing 130 does not necessarily have to be an item having a container-like shape as shown in FIG. 15, and may be a concave portion provided on a wall surface or the like.

Embodiment 6

Figure 16:
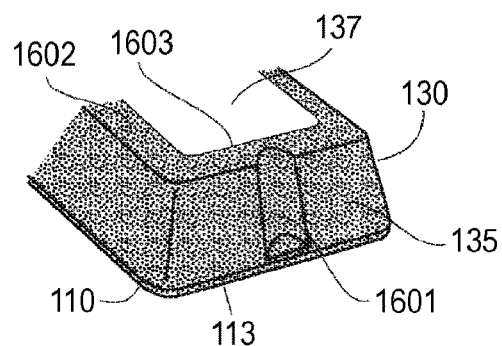
FIG. 16 is a perspective view of main parts of a display apparatus according to an embodiment 6.

FIG. 16 is a perspective view of main parts of a display apparatus according to an embodiment 6. FIG. 16 shows the display apparatus in the embodiment 6. The embodiment 6 is an application example of the embodiment 3 shown in FIG. 11. FIG. 16 is an overhead view when a video device is viewed from a bottom surface 137 side of the housing 130.

In the embodiment 6, one of the side surfaces 135 of the housing 130 includes a concave portion 1601 directed to a center direction of the housing. In the embodiment 6, as in the embodiment 3, a film 1602 is also adhered to cover a surface of the touch panel 110 on a touch surface 113 side. Further, the film 1602 is continuous with the touch surface 113 of the touch panel 110, and also extends around to the side surfaces 135 of the housing and is adhered thereto (dot portion in the drawing). At this time, the film 1602 is adhered to also cover the concave portion 1601 provided on one of the side surfaces 135.

The film 1602 is adhered to the concave portion 1601, whereby the film 1602 has an adhering surface having various angles. Accordingly, when an impact is applied to the touch panel 110 and the touch panel 110 is deformed, the film 1602 is pulled, and resistance against the film 1602 being peeled off from the housing 130 can be improved.

When the film is adhered to the display device 120 as described in the embodiment 2, or when the film is adhered to the support frame as described in the embodiment 4, the same effect can be obtained by providing the same concave portion on one of the end surfaces 122 of the display device 120 or one of surfaces of the support frame.

Embodiment 7

Figure 17:
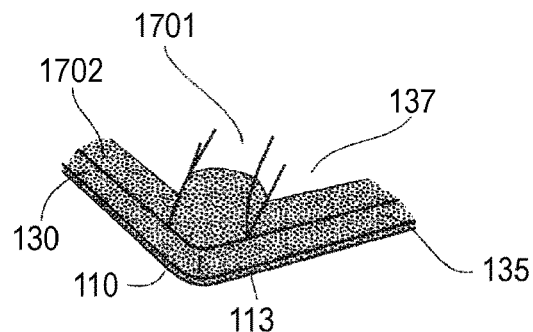
FIG. 17 is a perspective view of main parts of a display apparatus according to an embodiment 7.

FIG. 17 is a perspective view of main parts of a display apparatus according to an embodiment 7. FIG. 17 shows the display apparatus in the embodiment 7. The embodiment 7 is an application example of the embodiment 3 shown in FIG. 11. FIG. 17 is an overhead view when a video device is viewed from a bottom surface 137 side of the housing 130, and particularly focuses on a corner portion of the bottom surface 137 of the housing 130.

In the present embodiment, the bottom surface 137 of the housing 130 includes, in a region covering a corner of the bottom surface 137, a convex portion having a convex shape from an inner side to an outer side of the housing.

In the embodiment 7, as in the embodiment 3, a film 1702 is adhered to cover a surface of the touch panel 110 on a touch surface 113 side (dot portion in the drawing). Further, the film 1702 is continuous with the touch surface 113 of the touch panel 110, and also extends around to the side surfaces 135 of the housing and is adhered thereto. At this time, the film 1702 is adhered to also cover a convex portion 1701 provided on the housing.

Figure 18:
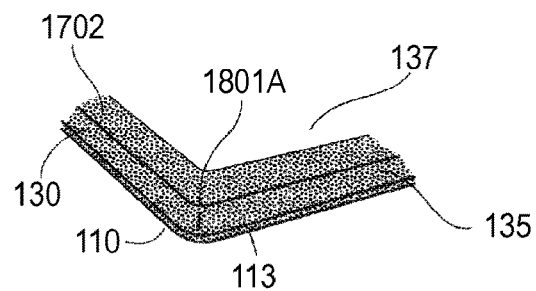
FIG. 18 is a perspective view of main parts of a housing according to a reference example formed in a simple box shape.

FIG. 18 is a perspective view of main parts of a housing according to a reference example formed in a simple box shape. When the housing is formed in the simple box shape as shown in FIG. 18, for example, a sharp portion is steeply formed on a corner 1801A or the like of the bottom surface 137 of the housing. When a film is adhered to such a portion, a crease is likely to be generated, aesthetics may be significantly impaired, or the film may be broken or peeled off from the crease. In the embodiment 7, the gentle convex portion is provided on the bottom surface 137 of the housing 130, thereby eliminating the steep sharp portion. Accordingly, a crease is less likely to be formed on the film 1702 adhered to the housing 130, aesthetics can be improved, and adhering strength of the film can be enhanced.

Figure 19:
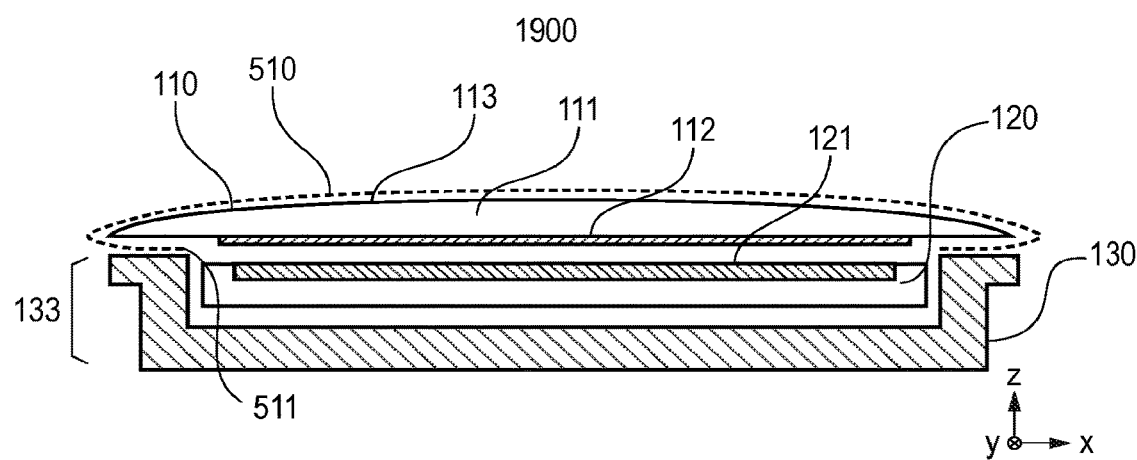
FIG. 19 is a cross-sectional view of a configuration example in which a cover glass of a touch panel has no clear end surface on an outer periphery.

In any of the embodiments of the present disclosure, although it has been described that a shape of the touch panel 110 is substantially quadrangular and the touch surface 113 is flat, it does not always have to be the case. The touch surface 113 may be a curved surface, and the touch panel may have a shape other than the substantially quadrangular shape. Depending on the shape of the touch panel, the cover glass 111 of the touch panel 110 may have no clear end surface on an outer periphery (for example, as shown in FIG. 19). FIG. 19 is a cross-sectional view of a configuration example in which a cover glass of a touch panel has no clear end surface on an outer periphery. In this case, in description of the embodiments, a portion described as end surfaces of the touch panel should be appropriately read as a portion representing an outermost periphery of the touch panel.

Other Background for Achieving Aspect of Present Disclosure

Regarding an aircraft display, many displays have a frontmost surface including a glass and a housing. Particularly in recent years, many frontmost surfaces are flat displays. Generally, there are many cases where a functional film such as an AG film or a protective film for preventing scattering of a glass is adhered on a glass of the frontmost surface. However, in most cases, the film only covers the glass portion.

Figure 20A:
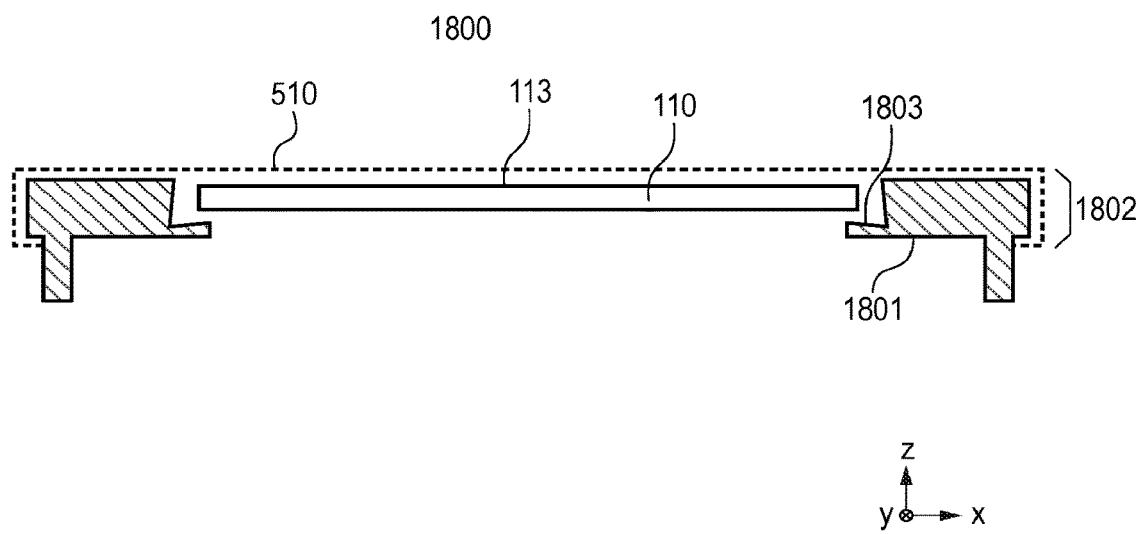
FIG. 20A is a cross-sectional view showing a configuration example in which an adhering range of a film is extended to a housing portion.

If an adhering range of the film can be extended to the housing portion, an effect of preventing scattering of the glass is further provided. FIG. 20A is a cross-sectional view showing a configuration example in which an adhering range of a film is extended to a housing portion. In a display apparatus 1800, a step 1803 is provided on side surfaces 1802 of a housing 1801, and the step 1803 supports the touch panel 110 from a surface opposite to the touch surface 113, thereby fixing the touch panel 110. The film 510 extends the adhering range to a portion of the housing 1801.

Figure 20B:
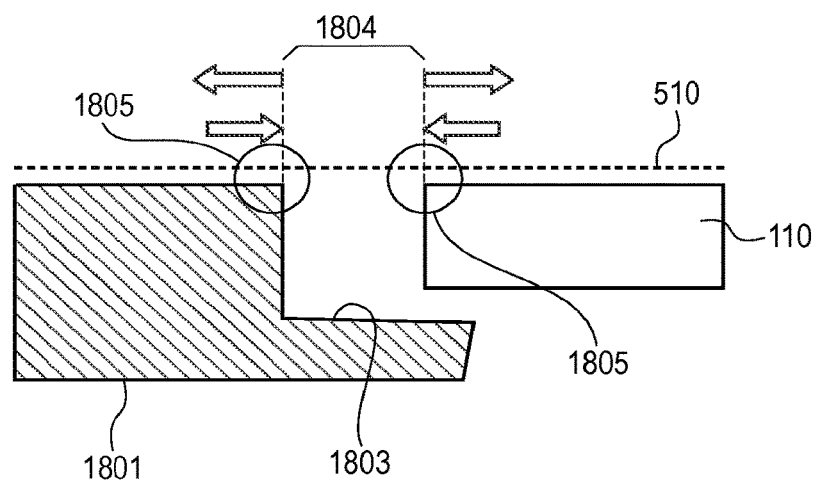
FIG. 20B is a cross-sectional view showing a configuration example in which an adhering range of a film is extended to a support frame portion.
Figure 21A:
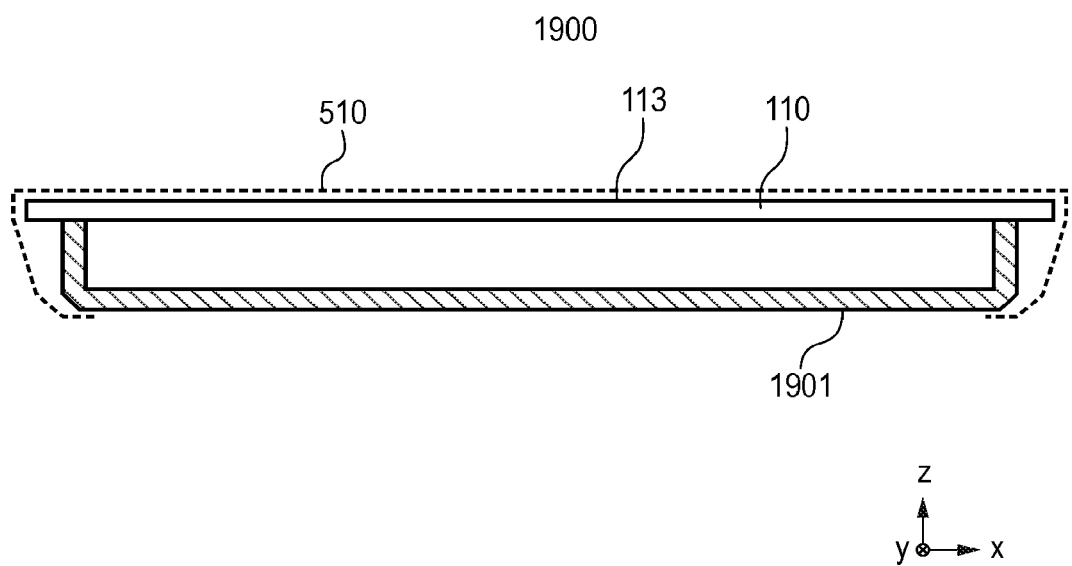
FIG. 21A is a cross-sectional view of main parts showing a state of film peeling during a reliability test in the configuration example shown in FIG. 20A.

FIG. 20B is a cross-sectional view of main parts showing a state of film peeling during the reliability test in the configuration example shown in FIG. 20A. Further, FIG. 21A shows a configuration example in which an adhering range of a film is extended to a support frame portion. In a display apparatus 1900, a support frame 1901 supports the touch panel 110 from a surface opposite to the touch surface 113, thereby fixing the touch panel 110. A maximum outer shape of the support frame 1901 is formed smaller than a maximum outer shape of the touch panel 110. The film 510 extends around to a back surface of the support frame 1901 and is adhered thereto.

Figure 21B:
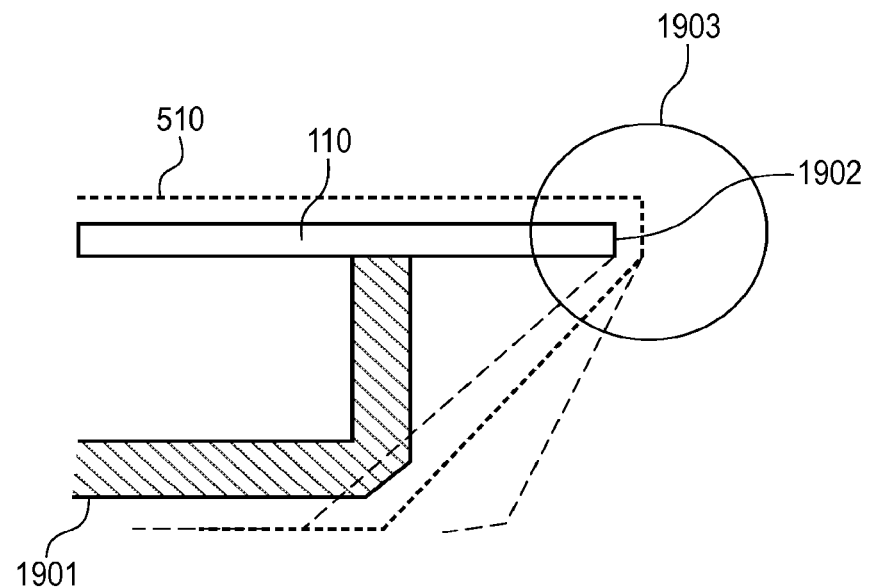
FIG. 21B is a cross-sectional view of main parts showing a state of film peeling during the reliability test in the configuration example shown in FIG. 20B.

However, in a temperature reliability test, a pressure reduction test, and the like required for the aircraft, the film is likely to be peeled off at an interface portion between the housing and the glass and an interface portion between the support frame and the glass. FIG. 21B is a cross-sectional view of main parts showing a state of film peeling during the reliability test in the configuration example shown in FIG. 21A. FIGS. 20B and 21B show the state of film peeling during the reliability test in the configuration examples shown in FIGS. 20A and 21A. As shown in FIG. 20B, in the display apparatus 1800, for example, during the temperature reliability test, due to a difference in a linear expansion coefficient between the resin or metal housing 1801 and the glass, an interval of a gap 1804 at a boundary portion is changed, and a stress is applied to the film at 1805 in the vicinity of the gap 1804, thus causing peeling. Further, in the pressure reduction test, air in the gap 1804 expands, and a stress is applied to the film, thus causing the peeling.

As shown in FIG. 21B, in the display apparatus 1900, due to a difference in a linear expansion coefficient between the resin or metal supporting frame 1901 and the glass, the film adhered across the touch panel 110 and the support frame 1901 is displaced to an outer side during heating and is displaced to an inner side during cooling. As a result, an edge 1902 of the touch panel 110 and the film are relatively displaced, and a stress is applied to the film at 1903 in the vicinity of the edge 1902, thus causing peeling.

Embodiment 8

Figure 22:
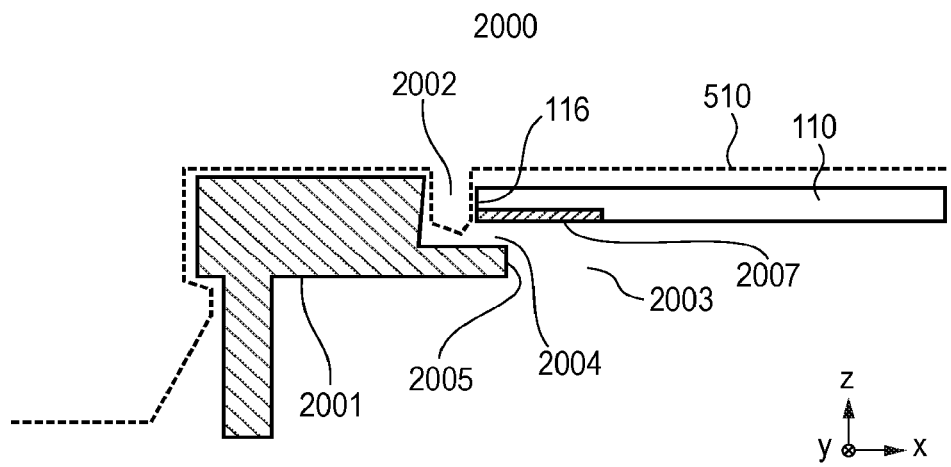
FIG. 22 is a cross-sectional view of main parts of a display apparatus according to an embodiment 8.

FIG. 22 is a cross-sectional view of main parts of a display apparatus according to an embodiment 8. FIG. 22 shows a cross-sectional view of the main parts of the display apparatus in the embodiment 8. In a display apparatus 2000, a cross section is shown which is cut along a plane perpendicular to the touch panel 110. In FIG. 22, the same numerals are used as reference numerals for components having the same functions as those in the embodiment described with reference to FIG. 2.

The display apparatus 2000 according to the embodiment 8 includes the touch panel 110, a bezel 2001, and the film 510. Illustration of a display device is omitted. In addition, although a substrate on which a circuit that controls the touch panel 110 and the display device is mounted, wiring that connects modules, and the like may be components of the display apparatus 2000, description thereof will be omitted because the description is complicated as in the embodiment 1.

The touch panel 110 receives a touch operation of the user as an input. The bezel 2001 is disposed along an outer periphery of the touch panel 110. The film 510 is adhered to cover a surface of the touch panel 110 touched by the user.

In the display apparatus 2000, the outer periphery of the touch panel 110 and an inner periphery of the bezel 2001 are arranged such that a gap 2002 is generated. The film 510 is also adhered to an inner wall surface of the gap 2002. The film 510 temporarily enters the gap 2002 from the outer periphery of the touch panel 110, and then exits the gap 2002 and is adhered to the bezel 2001 again.

Here, in an electronic device disclosed in JP-A-2018-200460, a viewing-angle-changing film is adhered to an LCD module, and a gap is formed between a bezel that covers an edge of the LCD module and the viewing-angle-changing film. The film does not enter the gap. Further, a ventilation port that communicates the gap with inside of the device is also not provided.

On the contrary, according to the display apparatus 2000, since the gap 2002 is intentionally provided between the touch panel 110 and the bezel 2001, and the film 510 enters the gap 2002, even when the touch panel 110 is broken, broken pieces of the glass can be prevented from jumping out of a boundary between the touch panel 110 and the bezel 2001. Since the gap between the glass and the housing where a difference in thermal expansion is generated can be relaxed only by an entering portion of the minute film 510, a stress cannot be transmitted to a front surface portion of a visible area, and peeling of the film 510 at the visible area can be prevented.

When (i) the touch panel 110 including the glass and (ii) the bezel 2001 formed of plastic are heated or cooled, a difference in thermal contraction of each component is generated. Accordingly, the interval of the gap 2002 changes and a tensile or compressive force is applied to a bridge portion between the touch panel 110 and the bezel 2001 of the film 510. Accordingly, the film 510 is broken or peeled off. However, when a predetermined amount of the gap 2002 is provided and a structure is adopted in which the film enters the gap, there are effects that the interval change can be relaxed at the film portion in the gap 2002, and a possibility of peeling in the visible area can be reduced.

The bezel 2001 of the display apparatus 2000 includes a ventilation port 2004 that communicates the gap 2002 with a space 2003 inside the display apparatus 2000.

Figure 23:
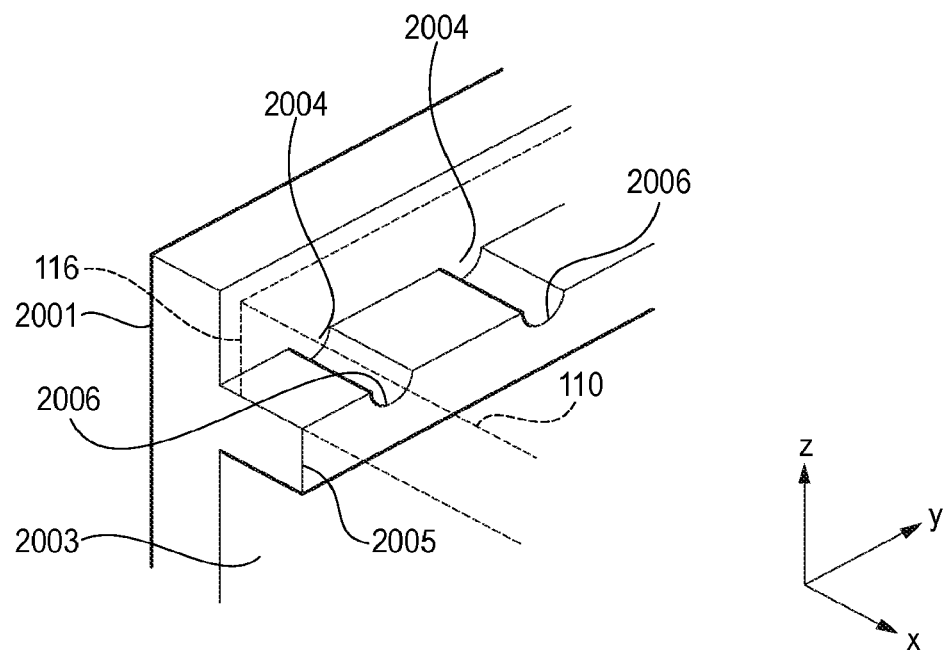
FIG. 23 is a perspective view of main parts of a support portion formed on a bezel.

FIG. 23 is a perspective view of main parts of a support portion formed on a bezel. FIG. 23 shows a perspective view of the main parts of the support portion formed on the bezel.

The bezel 2001 includes a support portion 2005 that supports the touch panel 110 by being in contact with a surface of the touch panel 110 opposite to a surface touched by the user. The support portion 2005 protrudes toward the space 2003 surrounded by the bezel 2001 and extends along a side portion of the touch panel 110 to be supported. The ventilation ports 2004 are formed as grooves 2006 engraved in the support portion 2005. The ventilation port 2004 communicates the gap 2002 with the space 2003 by being engraved in a surface of the support portion 2005 on which the touch panel 110 is placed. On an edge of the touch panel 110 placed on the support portion 2005, a presswork 2007 shown in FIG. 22 is provided on a surface facing the support portion 2005. The presswork 2007 is, for example, black, and is disposed such that the support portion 2005, a crease of the film 510, and the like are invisible to the user.

In the display apparatus 2000, the touch panel 110 is placed on the support portion 2005 formed on the bezel 2001, thereby fixing the touch panel 110 to the bezel 2001. The support portion 2005 is provided with the ventilation ports 2004 such that air in the gap 2002 is discharged to a lower portion. The ventilation ports 2004 are necessary for adhering the film 510 to an inner wall surface of the gap 2002.

According to the display apparatus 2000, after the film 510 is placed on the touch panel 110 and the bezel 2001, an air pressure in a portion below the touch panel 110 is lowered, so that air in the gap 2002 is suctioned into a lower portion through the ventilation ports 2004. As a result, the film 510 enters the gap 2002 accordingly. Accordingly, the display apparatus 2000 implements a configuration in which the film 510 is suctioned into the gap 2002 and the film 510 is also adhered to the inner wall surface of the gap 2002. The ventilation ports 2004 are created, whereby when the film 510 is adhered by vacuum molding or the like, the entering of the film 510 into the gap 2002 can be promoted, and the film 510 enters the gap 2002 deeper. Accordingly, a relaxation effect can be further increased. The relaxation effect relaxes displacement between the glass and the housing generated by the difference in thermal expansion only by the gap 2002 that is the entering portion of the minute film 510.

The ventilation port 2004 can be provided in various forms. In addition to the grooves 2006 according to the present embodiment, a plurality of protrusions on which the touch panel 110 is placed floating from the support portion 2005, a slit that penetrates the support portion 2005 in a thickness direction (Z-direction), and the like can be considered.

According to the display apparatus 2000 of the present embodiment, since the ventilation port 2004 provided in the support portion 2005 is formed by the groove 2006, the ventilation port 2004 can be relatively easily processed and obtained.

Embodiment 9

Figure 24:
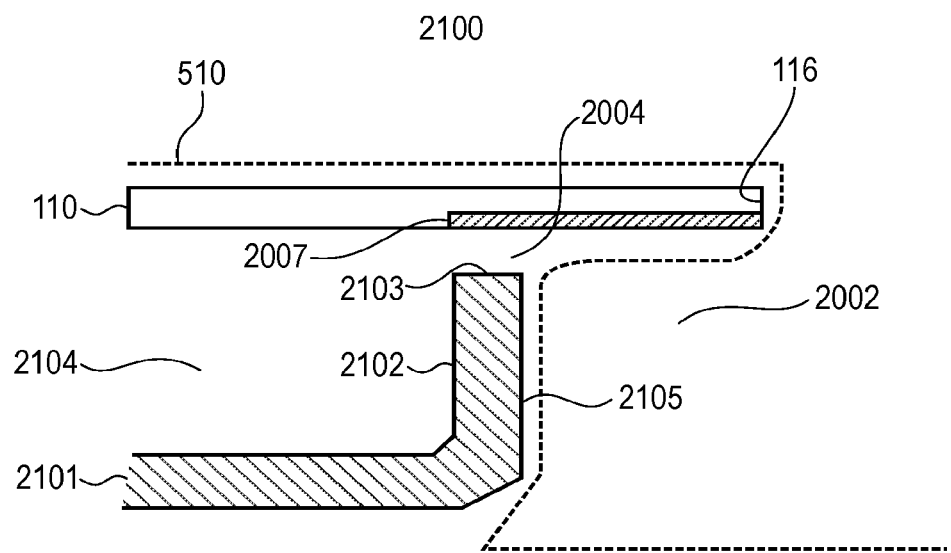
FIG. 24 is a cross-sectional view of main parts of a display apparatus according to an embodiment 9.

FIG. 24 is a cross-sectional view of main parts of a display apparatus according to an embodiment 9. FIG. 24 shows a cross-sectional view of main parts of a display apparatus 2100 according to the embodiment 9.

In the display apparatus 2100, a cross section is shown which is cut along a plane perpendicular to the touch panel 110. In FIG. 24, the same numerals are used as reference numerals for components having the same functions as those in the embodiment described with reference to FIG. 2.

The display apparatus 2100 according to the embodiment 9 includes the touch panel 110, a support member 2101, and the film 510. Illustration of a display device is omitted. In addition, although a substrate on which a circuit that controls the touch panel 110 and the display device is mounted, wiring that connects modules, and the like may be components of the display apparatus 2100, description thereof will be omitted because the description is complicated as in the embodiment 1.

The display apparatus 2100 has a configuration in which a bezel provided in the display apparatus 2000 is not provided and only the support member 2101 is provided. In the display apparatus 2100, the gap 2002 is created by providing a contact surface of the support member 2101 on an inner side relative to an outermost periphery of the touch panel 110. The contact surface is an upper end surface 2103 of the support portion 2102 in the support member 2101. The support member 2101 is disposed so as not to be in contact with the outermost periphery of the touch panel 110. The film 510 is also adhered to a surface of the touch panel 110 opposite to a surface touched by the user. On an edge of the touch panel 110 placed on the support portion 2102, the presswork 2007 is provided on a surface facing the support portion 2102. The presswork 2007 is, for example, black, and is disposed such that the support portion 2102, a crease of the film 510, and the like are invisible to the user.

Figure 25:
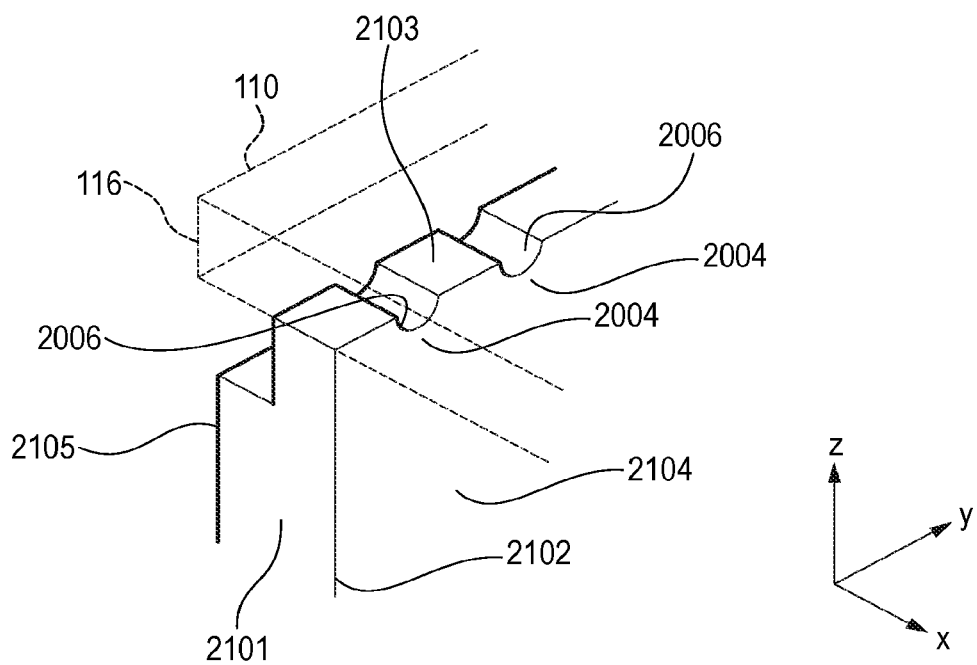
FIG. 25 is a perspective view of main parts of a support member on which a support portion is formed.

FIG. 25 is a perspective view of main parts of the support member on which the support portion is formed. FIG. 25 shows a perspective view of the main parts of the support member on which the support portion is formed.

In the support member 2101, the ventilation ports 2004 are provided in the upper end surface 2103 of the support portion 2102. The ventilation port 2004 can be, for example, the groove 2006. The support member 2101 connects, through the ventilation ports 2004, an outer side on a side where the user who views information exists to a space 2104 on an opposite side, which sandwich the touch panel 110.

According to the display apparatus 2100, after the film 510 is placed on the touch panel 110, an air pressure in a portion below the touch panel 110 is lowered, so that air in the gap 2002 is suctioned into a lower portion through the ventilation ports 2004. As a result, the film 510 enters the gap 2002 accordingly. Accordingly, the display apparatus 2000 implements a configuration in which the film 510 is suctioned into the gap 2002 and the film 510 is also adhered to a surface of the touch panel 110 opposite to a surface touched by the user. In the display apparatus 2100, the ventilation ports 2004 are provided in the support portion 2102, thereby suctioning the film 510 by suction of air from the space 2104. Accordingly, the film 510 is more reliably adhered to the surface of the touch panel 110 opposite to the surface touched by the user, and also to a side surface 2105 of the support member 2101.

In the embodiment shown in FIG. 24, although an outer side of the side surface 2105 of the support member 2101 is set as the gap 2002, this is an example of a structure, and the structure is not necessarily required. For example, as another configuration, there is a configuration shown in FIG. 26.

Figure 26:
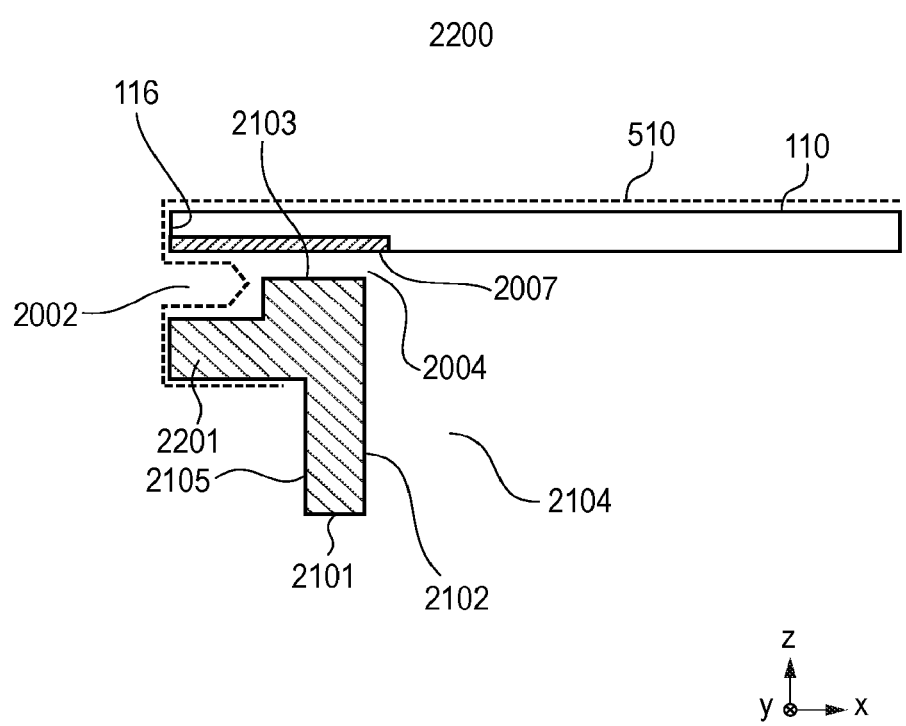
FIG. 26 is a cross-sectional view of main parts in which a protruding portion protrudes toward an outer side from a side surface of a support member.

FIG. 26 is a cross-sectional view of main parts in which a protruding portion protrudes toward an outer side from a side surface of a support member. FIG. 26 shows a cross-sectional view of the main parts in which the protruding portion protrudes toward the outer side from the side surface of the support member.

In a display apparatus 2200 according to the embodiment 9, a protruding portion 2201 is formed which protrudes toward an outer side from the side surface 2105 of the support member 2101. The gap 2002 is created between the protruding portion 2201 and the touch panel 110. Also in this case, by the ventilation port 2004 formed in the support portion 2102, the film 510 can be suctioned into the gap 2002, and the film 510 can be reliably adhered to an inner wall surface of the gap 2002.

Embodiment 10

Figure 27:
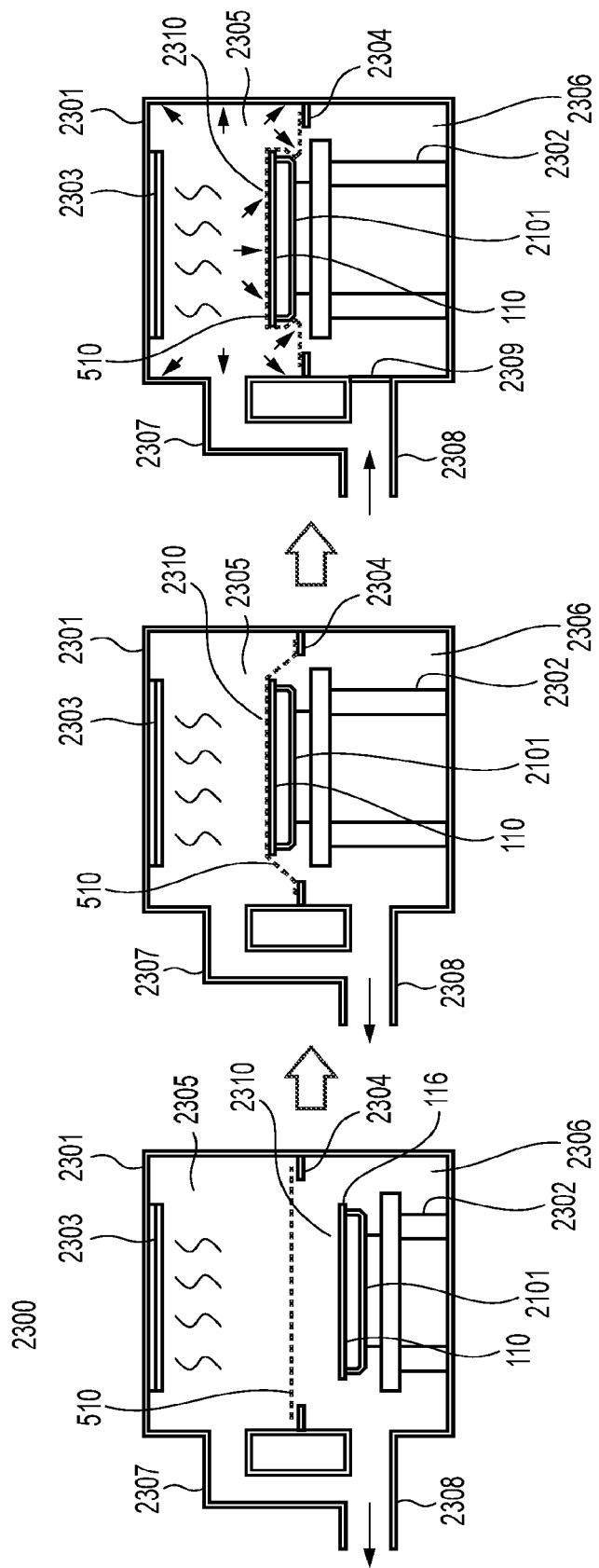
FIG. 27 is a process diagram showing a procedure for adhering a film by TOM-molding.

FIG. 27 is a process diagram showing a procedure for adhering a film by TOM-molding. FIG. 27 shows the procedure for adhering the film by the TOM-molding.

In an embodiment 10, the TOM-molding will be described which is an example of a method for adhering the film.

A film wrapping process based on the TOM-molding is executed by a wrapping apparatus 2300. The wrapping apparatus 2300 includes a chamber 2301 having an airtight structure, an elevation table 2302 provided in the chamber 2301, and a heater 2303.

In the chamber 2301, a frame-shaped film-fixing portion 2304 is provided at a boundary that divides an internal space into upper and lower portions. The film-fixing portion 2304 fixes an entire periphery of the film 510. An internal space of the chamber 2301 is partitioned into an upper space 2305 and a lower space 2306 by the film 510 fixed to the film-fixing portion 2304.

An upper supply/exhaust pipe 2307 is connected to the upper space 2305 of the chamber 2301, and a lower supply/exhaust pipe 2308 is connected to the lower space 2306. The upper supply/exhaust pipe 2307 and the lower supply/exhaust pipe 2308 are integrated and connected to a vacuum pump (not shown) or can be open to atmosphere. Further, the lower supply/exhaust pipe 2308 and the lower space 2306 are openable and closable by a closing valve 2309.

In order to perform film wrapping by using the wrapping apparatus 2300, the film 510 is fixed to the film-fixing portion 2304. A workpiece 2310 is placed on and fixed to the elevation table 2302. Here, the workpiece 2310 is assembled including, for example, the support member 2101 and the touch panel 110 shown in FIG. 24. The workpiece 2310 is not limited thereto.

The vacuum pump is driven to depressurize the upper space 2305 and the lower space 2306. At this time, the film 510 is simultaneously heated and softened using the heater 2303.

After the film 510 is softened to a predetermined hardness, the elevation table 2302 is raised. The elevation table 2302 is raised until the touch panel 110 of the placed workpiece 2310 pushes the film 510 up to a predetermined height. The height is at least a height by which a back surface of the support member 2101 is positioned above the film-fixing portion 2304.

The closing valve 2309 is closed while the heater 2303 is generating heat, and the lower space 2306 is sealed in a substantially vacuum state. The vacuum pump is stopped, and the upper supply/exhaust pipe 2307 and the lower supply/exhaust pipe 2308 are open to the atmosphere. At this time, the upper space 2305 is returned to an atmospheric pressure, while the lower space 2306 where the closing valve 2309 is closed remains substantially vacuum. The film 510, which partitions the upper space 2305 and the lower space 2306 and is in a softened state, is drawn to a lower space 2306 side due to a difference in an air pressure and is deformed. As a result, the film 510 adheres to an outer peripheral surface of the workpiece 2310 to wrap around the workpiece 2310 from a touch panel 110 side.

At this time, in the display apparatus 2100, the ventilation ports 2004 shown in FIG. 24 are provided, so that the film 510 is suctioned by suctioning air from the space 2104 of the support member 2101. According to the wrapping of the display apparatus 2100 based on the TOM-molding, the film 510 extends around to a surface of the touch panel 110 opposite to a surface touched by the user and also to the side surface 2105 of the support member 2101, so that the film 510 can be more reliably adhered to the workpiece 2310.

As described above, in the touch panel 110 where the touch surface 113 is covered by the film 510, the edge portion 116 where the adjacent end surfaces 114 intersect each other is covered by the continuous film 510. In the touch panel 110, in addition to the edge portion 116, a part of the other surface may be further covered by the continuous film 510.

In an adhering method such as the TOM-molding, the edge portion 116 of the touch panel 110 where the adjacent end surfaces 114 intersect each other can be favorably covered by the continuous film 510. For example, the touch panel 110, which is formed in a quadrangular plate shape, has four corners on the touch surface 113 that is the one surface. Further, there are also four corners on the other surface that is a surface opposite to the one surface. Side surfaces of the touch panel 110 in a plate thickness direction, which are sandwiched between the touch surface 113 and the other surface, are four end surfaces 114. Among these, the adjacent end surfaces 114 intersect at the edge portion 116, respectively. The edge portion 116 is a linear edge that connects a corner of the touch surface 113 to a corner of the other surface. That is, the edge portion 116 has a sharp corner. Both ends of the edge portion 116 are connected to sharp corners that are triangular-pyramid-shaped apex angles on front-and-back surfaces of the touch panel 110.

More precisely, the edge portion 116 may not be linear. That is, the edge portion 116 may be chamfered by cutting a sharp corner away. In this case, microscopically, the edge portion 116 is a surface.

In the adhering method such as the TOM-molding, in the plate-shaped touch panel 110, one continuous film 510 can be covered to adhere to the adjacent two end surfaces 114 without any gap from the one surface, to simultaneously adhere to the sharp corners having the triangular pyramid shape, and thus to wrap around the touch panel 110. The one continuous film 510 has a shape cut in from an outer shape to an inner side or has a shape without a concave portion. According to an adhering method such as the TOM-molding, for example, the film is formed with a development view in which corners in a quadrangle are cut out in a quadrangular shape. When lines, which connect internal corner portions of cut-out portions, are mountain-folded or valley-folded on the same surface side of the front-and-back surfaces to cover the touch panel 110, no overlapped portion along the edge portion 116 is generated. That is, the corner and the edge portion 116 can be continuously wrapped around without providing a gap.

In the touch panel 110 on which the film 510 is covered based on the adhering method such as the TOM-molding, no overlapped portion exists at the edge portion 116. Therefore, broken pieces and powder are less likely to jump out during breakage of glass. Further, since the edge portion 116, which is most likely to become a sharp edge during the breakage of the glass, can be continuously covered by the continuous film 510, the sharp edge is less likely to be formed.

A part of the other surface in addition to the edge portion 116 is also covered by the continuous film 510, whereby the anchor effect described above is generated, and the film 510 is less likely to be pulled out toward the touch surface 113 side. The film 510 extends to the other surface, so that a peeling point when the film 510 is peeled off can be further moved toward an inner side direction from an outer shape of the touch surface 113, which is less likely to be visually recognized by the user.

As a result, in order to improve the designability, in the display apparatuses 500, 800, 810, 830, 840, 1000, 1400, 1500, 1900, 2000, 2100, and 2200 that expose the corners and the edge portions 116 of the touch panel 110 to a front surface, it is possible to more effectively prevent broken pieces of the broken touch surface 113 from scattering, or prevent components from falling, or prevent sharp edges of the glass from adhering to the user.

Although the various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be naturally understood that they also belong to the technical scope of the present disclosure. Components in the various embodiments mentioned above may be combined optionally in the range without deviating from the spirit of the invention.

This application is based on and claims priority under 35 USC 119 from U.S. provisional Application No. 62/866,224 filed on Jun. 25, 2019, the contents of which are incorporated herein by reference.

What is claimed is:

1. A film wrapping display comprising: a panel that is transparent to light and is configured to display information on one surface of the panel; a support frame extended from an external housing or an external wall and configured to support the panel by being in contact with an other surface of the panel opposite to the one surface of the panel on which the information is displayed; and a film adhered to cover the one surface of the panel, wherein the film is adhered to the support frame in addition to the one surface of the panel, an edge of the film is positioned in a space on a side opposite to a side where a user who views the information displayed on the one surface of the panel exists while the film covers an outermost periphery of the panel and extends around to the space, and is adhered to the other surface, and the film does not cover a region used for displaying the information at the other surface.

2. The film wrapping display according to claim 1, wherein
a maximum outer shape of the support frame is smaller than a maximum outer shape of the panel.

3. The film wrapping display according to claim 1, wherein
the film adhered to the support frame is covered by a cover.

4. The film wrapping display according to claim 1, wherein
the panel is a protective glass of a touch panel.

5. The film wrapping display according to claim 1, further comprising
an anti-glare film adhered to a surface of the film that covers the one surface of the panel.

6. The film wrapping display according to claim 1, wherein
an edge portion where adjacent end surfaces of the panel intersect each other is covered by a continuous part of the film.

7. The film wrapping display according to claim 6, wherein
a part of the other surface of the panel is covered by the continuous part of the film in addition to the edge portion.

8. A film wrapping display comprising: a panel that is transparent to light and is configured to display information on one surface of the panel; a support frame extended from an external housing or an external wall and configured to support the panel from an other surface of the panel opposite to the one surface of the panel on which the information is displayed; and a film adhered to cover the one surface of the panel, wherein the film is adhered to the support frame and the other surface in addition to the one surface of the panel, an edge of the film is positioned in a space on a side opposite to a side where a user who views the information displayed on the one surface of the panel exists while the film covers an outermost periphery of the panel and extends around to the space, and the film does not cover a region used for displaying the information at the other surface.

9. The film wrapping display according to claim 8, wherein the support frame indirectly supports the panel from the side of the other surface of the panel.

10. The film wrapping display according to claim 9, further comprising:
a display device, wherein
the support frame supports the panel from the other surface of the panel via the display device.

* * * * *